(12) United States Patent
Dignam

(10) Patent No.: US 6,452,603 B1
(45) Date of Patent: Sep. 17, 2002

(54) CIRCUIT AND METHOD FOR TRILINEAR FILTERING USING TEXELS FROM ONLY ONE LEVEL OF DETAIL

(75) Inventor: David L. Dignam, Belmont, CA (US)

(73) Assignee: NVIDIA US Investment Company, Santa Clara, CA (US)

( * ) Notice: Subject to any disclaimer, the term of this patent is extended or adjusted under 35 U.S.C. 154(b) by 0 days.

(21) Appl. No.: 09/219,366

(22) Filed: Dec. 23, 1998

(51) Int. Cl.[7] .............................................. G06T 11/40
(52) U.S. Cl. ...................... 345/582; 345/428; 345/581; 345/583; 345/586; 345/589
(58) Field of Search ................................ 345/582, 581, 345/583, 588, 586, 606, 607, 428, 587

(56) References Cited

U.S. PATENT DOCUMENTS

| | | | |
|---|---|---|---|
| 4,692,880 A | 9/1987 | Merz et al. ................... | 364/521 |
| 4,945,500 A | * 7/1990 | Deering ....................... | 364/522 |
| 5,179,638 A | * 1/1993 | Dawson et al. ............. | 395/125 |
| 5,222,205 A | 6/1993 | Larson et al. ............... | 395/130 |
| 5,327,509 A | 7/1994 | Rich ........................... | 382/17 |
| 5,392,393 A | * 2/1995 | Deering ....................... | 395/162 |
| 5,402,533 A | 3/1995 | Kelley et al. ............... | 395/126 |
| 5,461,712 A | * 10/1995 | Chelstowski et al. ....... | 395/164 |
| 5,490,240 A | * 2/1996 | Foran et al. ................. | 395/130 |
| 5,548,709 A | 8/1996 | Hannah et al. ............. | 395/164 |
| 5,598,517 A | 1/1997 | Watkins ....................... | 395/141 |
| 5,602,984 A | * 2/1997 | Mieras ......................... | 395/501 |
| 5,606,650 A | 2/1997 | Kelley et al. ............... | 395/130 |
| 5,706,481 A | 1/1998 | Hannah et al. ............. | 395/519 |
| 5,745,118 A | 4/1998 | Alcorn et al. ............... | 345/430 |
| 5,751,292 A | 5/1998 | Emmot ......................... | 345/430 |

(List continued on next page.)

OTHER PUBLICATIONS

Synopsis Module Compiler Datasheet (5 pages from www.synopsis.com), Synopsis, Inc. ® 1998.

Patterson, David A. and Hennessy, John L., Computer Architecture: A Quantitative Approach, Second Edition (Chapter 1), Morgan Kaufmann Publishers, Inc. 1996.

Patterson, David A. and Hennessy, John L., Computer Architecture: A Quantitative Approach, Second Edition (Chapter 5), Morgan Kaufmann Publishers, Inc., 1996.

*Primary Examiner*—Matthew Luu
*Assistant Examiner*—Daniel J Chung
(74) *Attorney, Agent, or Firm*—Townsend and Townsend and Crew LLP

(57) ABSTRACT

A circuit and process perform trilinear filtering using four texels (called "nearest texels") that are nearest to a to-be-displayed pixel, and also using twelve additional texels (called "surrounding texels") that surround the nearest texels. The nearest texels and the surrounding texels (together called "fine texels") are all from only one level of detail L, while a filtered texel being generated is at another level of detail L+p, wherein p is a fractional level of detail. The filtered texel is used in rendering the to-be-displayed pixel, and can be identical to the texel obtained by trilinear filtering in the prior art. The circuit and process use fine texels to regenerate a quad of coarse texels that are used with a quad of the nearest texels to perform trilinear filtering. Alternatively, the circuit and process generate coefficients from the S and T coordinate fractions, and multiply the coefficients with the nearest texels and with summed texels (obtained by adding three surrounding texels and optionally the nearest texel), and add the products to obtain the filtered texel. In one implementation, a coarse texel regenerated from a number of fine texels is compared with another coarse texel pre-existing in a mipmap at the level of detail L+1, and in case of a match additional coarse texels are regenerated for the trilinear filtering in a single cycle. In case of no match, trilinear filtering is performed in two cycles using pre-existing coarse texels of the L+1 mipmap.

42 Claims, 32 Drawing Sheets

Microfiche Appendix Included
(3 Microfiche, 21 Pages)

U.S. PATENT DOCUMENTS

| | | | |
|---|---|---|---|
| 5,757,374 A | * 5/1998 | Nakamura et al. | 345/425 |
| 5,761,720 A | 6/1998 | Krishnamurthy et al. | 711/140 |
| 5,831,624 A | * 11/1998 | Tarolli et al. | 345/430 |
| 5,943,058 A | * 8/1999 | Nagy | 345/430 |
| 5,987,567 A | * 11/1999 | Rivard et al. | 711/118 |
| 6,002,407 A | * 12/1999 | Fadden | 345/430 |
| 6,078,335 A | * 6/2000 | Wong et al. | 345/430 |
| 6,104,415 A | * 8/2000 | Gossett | 345/513 |
| 6,184,894 B1 | * 2/2001 | Rosman et al. | 345/430 |
| 6,191,793 B1 | * 2/2001 | Piazza et al. | 345/430 |
| 6,259,460 B1 | * 7/2001 | Gossett et al. | 345/552 |

* cited by examiner

| Clock# | Texture Cache | Used Cache0 | Used Cache1 | Used Cache2 | Used Cache3 | Used Cache4 | Used Cache5 | Used Cache6 | Used Cache7 | Output |
|---|---|---|---|---|---|---|---|---|---|---|
| 1 | 03 13<br>02 12<br>01 11<br>00 10 | 03 13<br>01 12<br>01 11<br>00 10 | X | X | X | X | X | X | X | X |
| 2 | 23 33<br>22 32<br>21 31<br>20 30 | 23 33<br>22 32<br>21 31<br>20 30 | 03 13<br>02 12<br>01 11<br>00 10 | X | X | X | X | X | X | pix0 |
| 3 | 33 43<br>32 42<br>31 41<br>30 40 | 43 X<br>42 X<br>41 X<br>40 X | 23 33<br>22 32<br>21 31<br>20 30 | 03 13<br>02 12<br>01 11<br>00 10 | X | X | X | X | X | pix1 |
| 4 | 43 53<br>42 52<br>41 51<br>40 50 | 43 53<br>42 52<br>41 51<br>40 50 | 23 33<br>22 32<br>21 31<br>20 30 | 03 13<br>02 12<br>01 11<br>00 10 | X | X | X | X | X | pix2 |

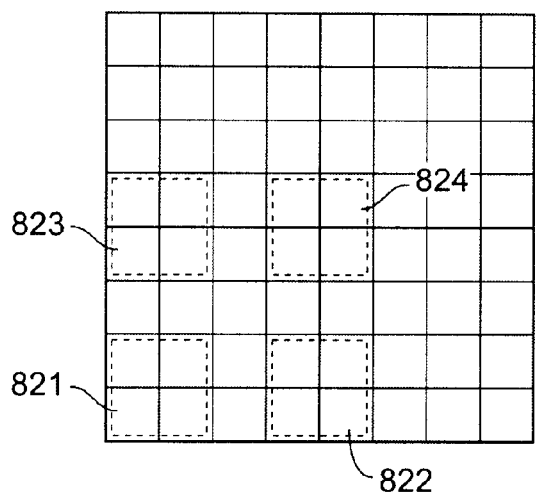
FIG. 8B
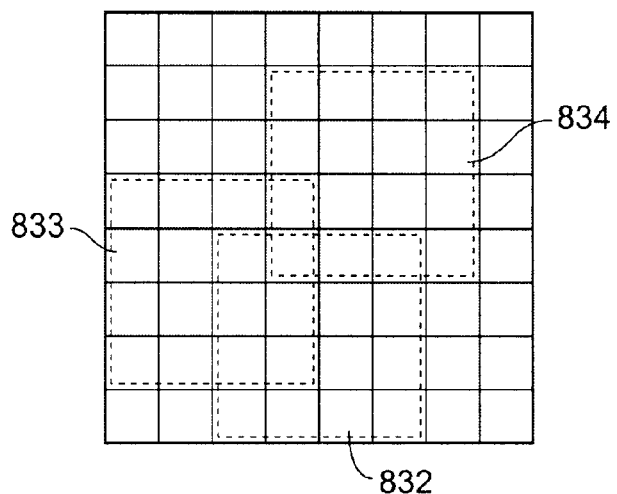
FIG. 8C
| S−1<br>T+2 | S<br>T+2 | S+1<br>T+2 | S+2<br>T+2 |
|---|---|---|---|
| S−1<br>T+1 | S<br>T+1 | S+1<br>T+1 | S+2<br>T+1 |
| S−1<br>T | S<br>T | S+1<br>T | S+2<br>T |
| S−1<br>T−1 | S<br>T−1 | S+1<br>T−1 | S+2<br>T−1 |
FIG. 8D

CIRCUIT AND METHOD FOR TRILINEAR FILTERING USING TEXELS FROM ONLY ONE LEVEL OF DETAIL

CROSS REFERENCE TO MICROFICHE APPENDICES

Appendices A, B and C which are part of the present disclosure, are included in a microfiche appendix consisting of 3 sheets of microfiche having a total of 121 frames, and the microfiche appendix is incorporated herein by reference in its entirety. Microfiche Appendices A and B are listings of computer programs and related data including source code in the language VERILOG and can be compiled by the Synopsys Design Compiler available from Synopsys, Inc. 700 East Middlefield Road, Mountain View, Calif. 94043, Phone 1-650-962-5000, and on the Internet at http://www.synopsys.com. Circuitry obtained from the listings in Microfiche Appendices A and B can be modified to supply nearest texels and texels surrounding the nearest texels for use in implementing trilinear filtering in one embodiment of this invention as described more completely below. Microfiche Appendix C contains documentation of the circuitry descriptions in Appendices A and B.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

U.S. Pat. No. 5,751,292 granted to Emmot describes a texture for use in displaying surface detail of an object modeled in a computer (column 1, lines 12–15). The computer uses a number of texels (column 7, line 54) that are point elements of a two-dimensional image (referred to as a "texture", e.g. surface detail of leather) and that are mapped onto a surface of a three-dimensional object (column 1, lines 44–53), e.g. a seat (thereby to form the image of a leather seat). Each texel in a texture is normally defined by S and T coordinates (sometimes called "U and V coordinates") of the texel. The S and T coordinates identify the location of the center of a texel relative to the two-dimensional texture (column 1, lines 59–60). For example, texel 12 in FIG. 1A has the coordinates S12 and T12.

To eliminate aliasing, texels can be "filtered" (low pass) to obtain a value at the location of a to-be-displayed pixel by use of adjacent texels to generate the filtered texel. For example, Emmot states that "for each display screen pixel that is rendered with texture data from a two-dimensional texture map, as many as four texels . . . or eight texels . . . may be accessed from the cache memory to determine the resultant texture data for the pixel" (column 14, lines 22–27).

The above-described filtering of texels can be of three types. As stated by Emmot, "[w]hen a point sampling interpolation mode is established, the resultant texel data equals the single texel that is closest to the location defined by the pixel's S, T coordinates in the texture map. Alternatively, when bilinear or trilinear interpolation is employed, the resultant texel data is respectively a weighted average of the four or eight closest texels . . . The weight given to each of the multiple texels is determined based upon the value of the gradient and [fractional] components of the S and T coordinates provided to the texel interpolator . . . " (column 14, lines 32–41).

Specifically, the intensity I for a point 9 (FIG. 1A) is obtained by bilinear interpolation of four texels 10–13 (also called a "quadruplet" and abbreviated as "quad") that are adjacent to each other. If the four texels 10–13 have intensities I0–I3, intensity I is given by I=Ct((Cs(I1–I0)+I0)–(Cs(I3–I2)+I2))+(Cs(I3–I2)+I2), where Cs and Ct are the distances of point 9 from the (S,T) coordinates of texel 12. See U.S. Pat. No. 5,706,481 (incorporated by reference herein in its entirety) at column 8, lines 50–59. In bilinear filtering, the four texels 10–13 are from a texture at a single magnification (called "level of detail" and abbreviated as "LOD").

Trilinear filtering uses a first filtered texel obtained by bilinear interpolation of a first quad at a level of detail L (having an integer value, e.g. 2), and a second filtered texel obtained by bilinear interpolation of a second quad at a level of detail L+1 as follows. An interpolation is performed between the first and second filtered texels to obtain a filtered texel at a third LOD (having a real value, e.g. value 2.5) that is between L and L+1. Therefore, trilinear filtering normally requires that a cache address generator 6 (FIG. 1B; see U.S. Pat. No. 5,327,509) generate the addresses of four texels at level of detail L and four texels at level of detail L+1. Cache address generator 6 supplies the eight addresses to a texture pattern memory 7 (FIG. 1B) that hold texels belonging to each of L and L+1 levels of detail. A texture trilinear interpolator 8 uses the eight texels to perform the interpolation.

SUMMARY

A circuit and process in accordance with the invention perform trilinear filtering using a number (e.g. 4) of texels (called "nearest texels") that are nearest to a to-be-displayed pixel, and also use an additional number (e.g. 12) of texels (called "surrounding texels") that surround the nearest texels. The nearest texels and the surrounding texels are all from only one level of detail L, while a filtered texel generated by the circuit and process is at a level of detail between L and L+1. The filtered texel is used in rendering the to-be-displayed pixel, and can be made identical to a texel obtained by trilinear filtering in the prior art.

In a first embodiment, the circuit and process use the nearest texels and the surrounding texels (all of which are at a level of detail L) to generate a first quad of texels at a coarse level of detail L+1. Thereafter, the generated quad (at the coarse level of detail L+1) is used with a second quad of the nearest texels (at the level of detail L) to perform trilinear filtering. In the first embodiment, generation of the first quad is performed by a coarse texel generator, and interpolation between two levels of detail L and L+1 is performed by an interpolation circuit that are both included in the circuit (also called "single level trilinear circuit") of the first embodiment.

Specifically, the coarse texel generator has input terminals (hereinafter "fine texel terminals") coupled to two buses: the nearest texel bus and to the surrounding texel bus to receive therefrom a total of sixteen texels at the level of detail L. The coarse texel generator also has an output bus (hereinafter "coarse texel bus") to carry away the quad of coarse texels generated therein. The nearest texels (received from the nearest texel bus) and the surrounding texels (received from the surrounding texel bus) form four quads, wherein all four quads are adjacent to each other and are from the level of detail L, and each quad touches at least two other quads (in a manner similar to the four quadrants of a square). The coarse texel generator includes arithmetic units that average texels in the four quads (individually for each quad) to form four coarse texels that are supplied to the coarse texel bus.

The interpolation circuit has several groups of input terminals. A first group of input terminals (hereinafter "coarse quad terminals") are coupled to the coarse texel bus to receive the quad of coarse texels. A second group of input terminals (hereinafter "fine quad terminals") are coupled to the nearest texel bus to receive a quad of nearest texels. A third group of input terminals (hereinafter "coordinate terminals") are coupled to the coordinate input bus to receive therefrom fractional parts of the S and T coordinates (also called "S and T coordinate fractions") for the filtered texel. A fourth group of input terminals (hereinafter "LOD terminals") are coupled to the level of detail bus. The interpolation circuit also has output terminals (hereinafter "filtered texel output terminals") that are coupled to the texel output bus to supply thereto the filtered texel obtained by interpolation. Specifically, the interpolation circuit performs trilinear interpolation between the four coarse texels from the coarse texel generator and four of the fine texels (one fine texel from each of the four quads) by use of the texel's S and T coordinate fractions and the level of detail fraction to generate the filtered texel on the texel output bus.

In the first embodiment, the circuit and process generate texels at a coarse level of detail L+1 twice: a first time to create all texels at the coarse level of detail L+1 (for an initial set of mipmaps), and a second time to create a quad of coarse texels that are used for trilinear interpolation. Therefore, when generating the coarse texels for a second time, all texels at the coarse level of detail L+1 are not created. Instead, in this embodiment, only the specific quad of coarse texels that are required at the moment for trilinear interpolation are created.

The regeneration of coarse texels (i.e. generation of the coarse texels a second time) is performed in the coarse texel generator that is included in a texture system of a graphics processor, and the resulting coarse texels are used directly (without storage in main memory) by the interpolation circuit (also included in the texture subsystem) to perform trilinear filtering. In contrast, the first act of generating coarse texels (for the initial set of mipmaps) is performed elsewhere (e.g. in a central processing unit (CPU)), and thereafter the coarse texels are stored in memory. At some later time, the coarse texels are conventionally fetched into a texture cache and used with fine texels in trilinear interpolation (performed without regeneration). Alternatively, in the first embodiment, a quad of coarse texels is freshly generated (in the act called "regenerating"), and eliminates use of previously-generated coarse texels (that remain in memory). Note that only the quad that is necessary for trilinear interpolation is generated by the coarse texel generator. Note further that the previously-generated coarse texels (at level of detail L+1) are used in the first embodiment only when regenerating even coarser texels (at level of detail L+2) for use in trilinear filtering (between levels L+1 and L+2).

Regeneration of coarse texels (i.e., generation of coarse texels a second time) as described herein requires a bus from texture cache to have additional width, e.g., to carry sixteen texels instead of the eight texels required (four at each level of detail) in conventional trilinear filtering, and further requires additional hardware, e.g., in the coarse texel generator. However, regeneration eliminates hardware that may otherwise be required in the prior art. For example, regeneration eliminates circuitry required in a cache address generator to simultaneously generate addresses of the coarse texels and of the fine texels. Regeneration also eliminates storage elements required in a texture cache to temporarily hold the coarse texels. Such regeneration may reduce memory bandwidth by reducing or eliminating the fetching of coarse texels into the texture cache that may be otherwise required in the prior art. Depending on the implementation, the savings in memory bandwidth, address generation hardware, and cache size can outweigh any extra circuitry required for regenerating the coarse texels.

In one variant of the first embodiment, a filter of the same order (e.g. a linear filter such as a box filter) is used in both generation and regeneration of coarse texels. In one specific implementation, the nearest texels and the surrounding texels form four quads (wherein each quad touches at least two other quads), and the four quads are each averaged individually (during regeneration) to form four coarse texels. In this implementation, the four coarse texels created by such averaging are identical to texels obtained during the first act of generating coarse texels if the exact same filter is used in both generation and regeneration of coarse texels.

However, in other variants, filters of different orders are used. For example, the first act of generation is done with a gaussian filter (because speed and the number of gates are not critical when mipmaps are being generated off-line) and the second act of generation is done with a box filter (because the resulting quad of coarse texels normally needs to be created within a graphics processor that functions within certain constraints (e.g. speed and gate count) imposed by real time display). Note that such use of different filters may result in a filtered texel that is slightly different from conventional trilinear filtering.

In a second embodiment, the circuit and process use the nearest texels and the surrounding texels at a fine level of detail L to directly generate a filtered texel, without generation of the quad of coarse texels at a coarse level of detail L+1 (as described above for the first embodiment). One implementation of the circuit (also called "single level trilinear circuit") includes a coefficient generator that uses the texel coordinate fractions and the level of detail fraction p to generate coefficients, and a multiply-add circuit that receives the coefficients from the coefficient generator and uses the coefficients to generate the filtered texel. The multiply-add circuit includes a number of adders that are coupled to the surrounding texel bus. Each adder receives three texels from the surrounding texel bus and supplies to a multiplier (included in the multiply-add circuit) a summed texel obtained by adding the three texels. All such multipliers in the multiply-add circuit are coupled to the plurality of adders to receive therefrom the summed texels, and to the nearest texel bus to receive therefrom the nearest texels. The multiply-add circuit performs a sum of products to generate the filtered texel. Specifically, the multipliers multiply the summed texels and the nearest texels with the respective coefficients, and an adder coupled to the multipliers adds the products thereby to generate the filtered texel.

The second embodiment has advantages (over the prior art use of previously-generated coarse texels) that are similar or identical to the advantages of the first embodiment described herein. Moreover, under certain conditions, the second embodiment requires fewer gates for implementation than the first embodiment. Also, the second embodiment has lower latency because the arithmetic operations are performed in parallel as compared to serialized performance of such operations in one implementation of the first embodiment.

The single level trilinear circuit described above can be used either directly, or depending on a mode that indicates trilinear filtering to be performed using texels of a single level. The mode can be set by a software driver process (executed in a CPU) that regenerates a coarse texel from a number of fine texels by a method identical to the method (e.g. box filter) used by hardware in the graphics processor, and compares the regenerated texel with another coarse texel that is pre-existing in a mipmap at the level of detail L+1. In case of a match, such coarse texels are regenerated by the single level trilinear circuit (e.g., in a single cycle). In case of no match, the single level trilinear circuit performs trilinear filtering using pre-existing coarse texels of the L+1 mipmap (e.g., in two cycles by inverting the fractional level of detail p in one of the two cycles). Trilinear filtering using pre-existing coarse texels may be necessary, e.g. if texels in the L+1 mipmap were generated by a circuit other than a box filter (such as a SINC filter, a gaussian filter, or a Bartlett filter). The process may be implemented in two different circuits, e.g. a central processing unit (CPU) that compares the regenerated texel with the pre-existing texel and sets the mode, and a graphics processor that is responsive to the mode.

BRIEF DESCRIPTION OF THE DRAWINGS

FIGS. 8B and 8C illustrate texels in one, two, or four cache lines that need to be accessed to generate either a quad of texels or 16 texels depending on the S and T coordinates.

FIG. 8D illustrates the addresses of all texels (in a four-by-four) generated by use of S and T coordinates of a base texel.

DETAILED DESCRIPTION

Figure 1A:
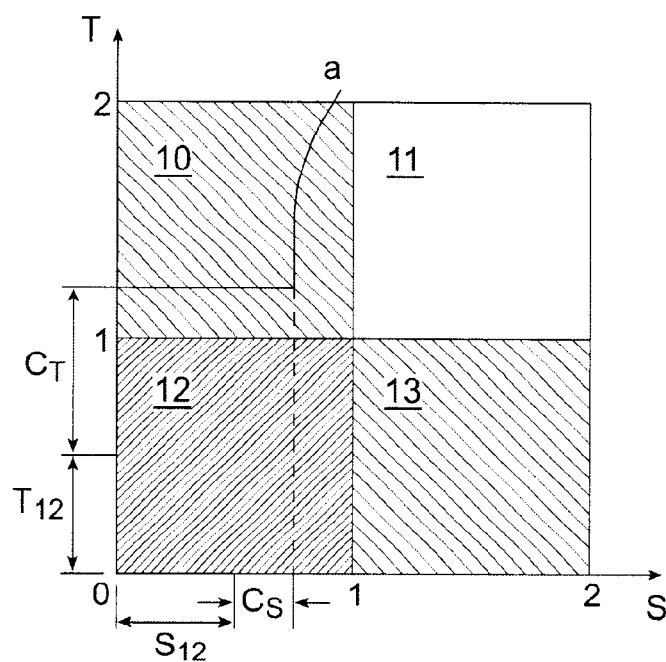
FIG. 1A illustrates four texels at a single level of detail for use in bilinear filtering.

A circuit 200 (FIG. 2B) and process 220 (FIG. 2C) in accordance with the invention perform trilinear filtering using four texels 10–13 (FIG. 2A) that are nearest to a to-be-displayed pixel 9, and also use twelve texels 14–25 that touch the nearest texels 10–13. Nearest texels 10–13 and surrounding texels 14–25 are all from only one level of detail L, while a filtered texel (not shown in FIG. 2A) generated by circuit 200 and process 220 is at level of detail between L and L+1. Texels 10–25 are arranged in plane, and are addressed by two coordinates S and T. For example, texel 15 has the S and T coordinates (0,0) and texel 21 has the S and T coordinates (3,3). Note that in a formula described below in reference to multipliers 541–548 in FIG. 5F, texels 10–25 are identified by the corresponding S and T coordinates. Specifically, these S and T coordinates are concatenated with the S coordinate first and preceded by "Tex," e.g. texel 10 is sometimes referred to as Tex 12.

Figure 2A:
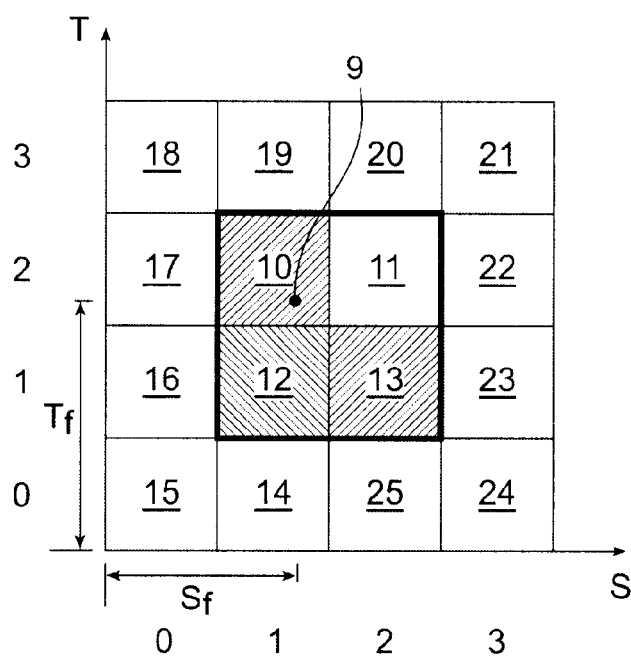
FIG. 2A illustrates sixteen texels at a single level of detail for use in trilinear filtering in one embodiment of the invention as illustrated in FIGS. 2B and 2C (described below).
Figure 1B:
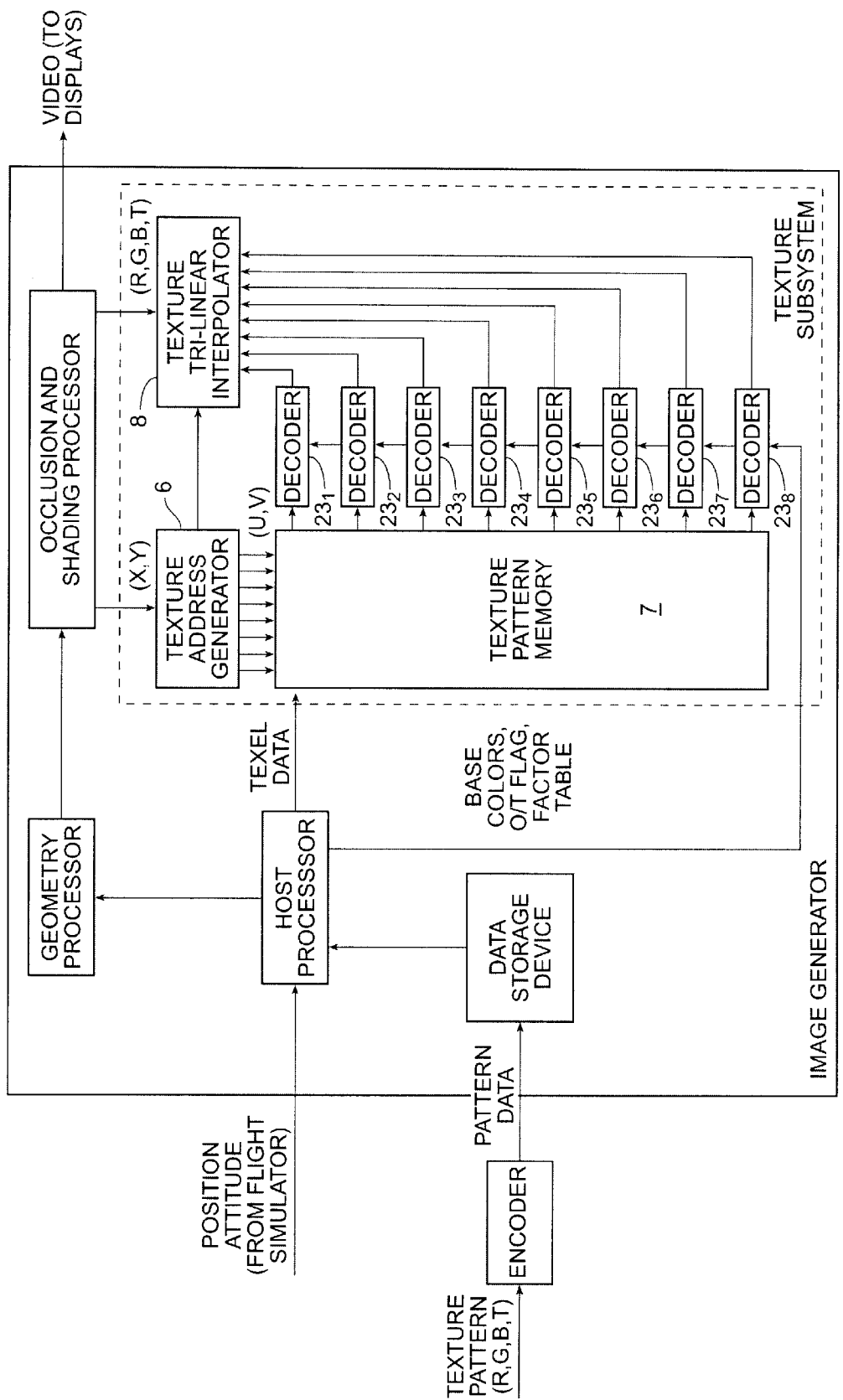
FIG. 1B illustrates a prior art circuit for performing trilinear filtering.
Figure 2B:
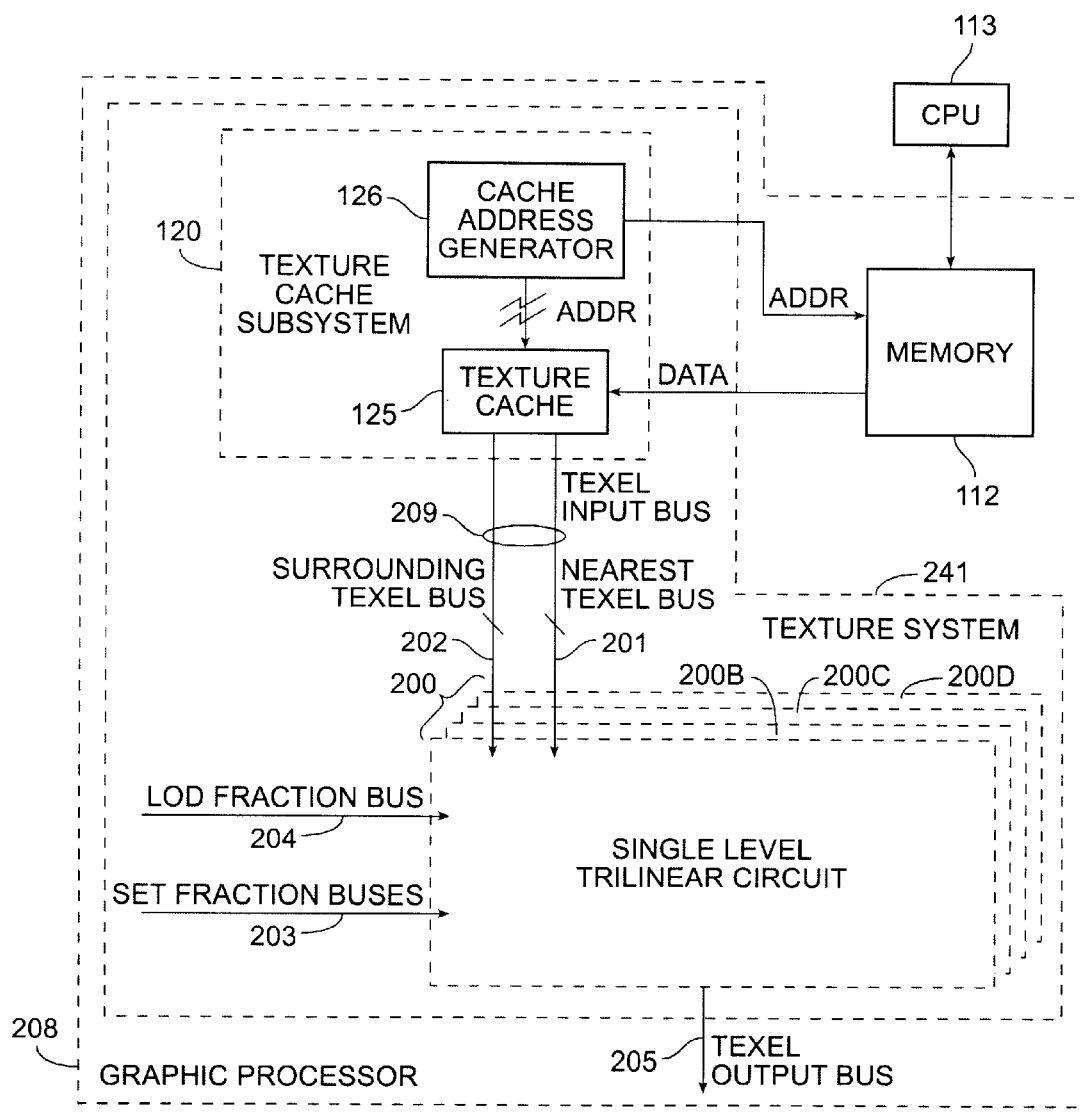
FIG. 2B illustrates, in a high level block diagram, a single level trilinear circuit that uses texels from only one level of detail as illustrated in FIG. 2A to perform trilinear filtering as illustrated in FIG. 2C (described below).

When process 220 (FIG. 2C) is performed in a texture system 241 (FIG. 2B), a cache address generator 126 passes to memory 112 the memory addresses of the nearest texels 10–13, and memory addresses of surrounding texels 14–25, thereby to cause the addressed texels 10–25 to be fetched (in act 221) into texture cache 125 (FIG. 2B). Texture cache 125 supplies the addressed texels 10–25 as and when needed by circuit 200 (FIG. 2B), thereby to allow circuit 200 to perform filtering. In one implementation, presence of texture cache 125 (also called "cache memory" or simply "cache") improves performance significantly, because the memory bandwidth required in the absence of cache 125 to fetch texels 10–25 from main memory would be doubled (from the memory bandwidth conventionally required to fetch four texels for coarse and fine LODs—total of eight texels).

Due to locality inherent in the access of the surrounding texels 14–25 in addition to the nearest texels 10–13, the reduction in cache performance due to the retrieval of sixteen texels (as opposed to eight in conventional trilinear filtering) is minimal (e.g., less than 10% speed penalty). Although the processing of 16 texels requires more hardware in a texture filter and a wider cache, such an implementation eliminates hardware otherwise required in the cache address generator as well as storage elements otherwise required in the cache for handling texels at level of detail L+1.

Note that components 112–128 (i.e., cache memory 125, cache address generator 126, and memory 112) are not significant aspects of the invention. That is, components 112–128 can be implemented by any circuits well known to a person skilled in the design of graphics processors, as long as the components support the supply to circuit 200 of sixteen texels 10–25 that are at a single level of detail L. An illustrative implementation of cache address generator 126 and texture cache 125 is provided in microfiche Appendix A that is incorporated by reference herein in its entirety. The implementation in microfiche Appendix A is modified for use with one embodiment of the invention as described below in reference to FIGS. 8A–8C.

Circuit 200 (FIG. 2B) has a first bus 201 (hereinafter "nearest texel bus") to receive the nearest texels 10–13, and a second bus 202 (hereinafter "surrounding texel bus") to receive the surrounding texels 14–25. In addition to buses 201 and 202, circuit 200 has a coordinate input bus 203 that carries the coordinates of the to-be-generated texel, a level of detail bus 204 that carries the fractional level of detail p, and a texture output bus 205 that carries the filtered texel. Note that although two distinct buses 201 and 202 (or buses 203 and 204) are being described here for convenience, a single bus is used to carry all texels (or to carry the S, T and p signals) in one implementation.

In one such implementation, only one bus 209 carries all the texels, in a time shared manner wherein some texels (e.g. nearest texels) are carried at one time (in a first clock cycle) and remaining texels (e.g. surrounding texels) are carried at another time (in a second clock cycle). Note also that depending on the implementation, any number of cycles, or fractions of a single cycle may be used to transfer texels over the single bus (also called "texel input bus") 209. A register can be used to hold an intermediate result obtained from texels that are received over the single bus 209 in a first cycle for use in a second cycle.

Circuit 200 uses (as illustrated by act 222 in FIG. 2C) texels 10–25 from texture cache 125 to create a filtered texel that is at a level of detail L+p. The level of detail L+p is between L and L+1, so that L≦L+p<L+1, wherein L is the level of detail of texels 10–25 (as used here "between" is meant to be inclusive of L but exclusive of L+1). The filtered texel generated by circuit 200 is used in rendering the to-be-displayed pixel 9.

Figure 2C:
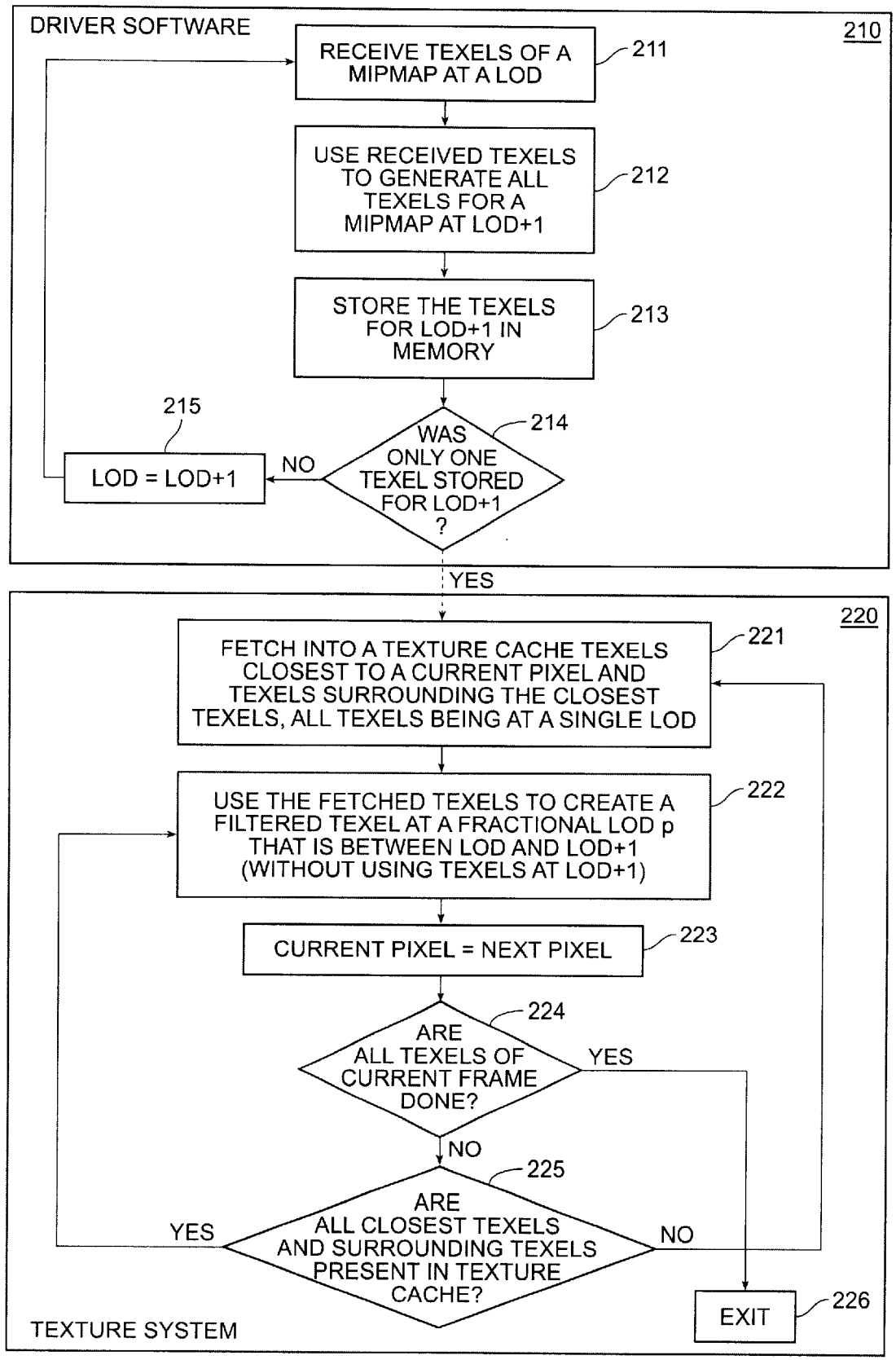
FIG. 2C illustrates, in a high level flow chart, acts for using the sixteen texels of FIG. 2A to perform trilinear filtering.

After generation of a filtered texel, cache address generator 126 (FIG. 2B) processes the next pixel, i.e., drives address signals indicative of the next pixel (in act 223 in FIG. 2C) to texture cache 125. Then, texture subsystem 120 checks (see act 224 in FIG. 2C) if all texels 10–25 are present in texture cache 125. If so, subsystem 120 continues processing for the next pixel (e.g. process 220 returns to act 222 as illustrated in FIG. 2C). If not, subsystem 120 returns to act 221 to fetch the missing texels (at the single level of detail L) into texture cache 125.

Note that the process 220 of generating a filtered texel is performed after performance of another process 210 (FIG. 2C) for generating mipmaps. Specifically, process 210 (that may be performed off-line, e.g. in a central processing unit 113 in FIG. 2B) receives (in act 211) all texels at a given level of detail L (also called "fine level of detail") and uses the received texels (in act 212) to generate all texels for a mipmap at level of detail L+1 (also called "coarse level of detail"). Next, process 210 (also called "driver software") stores the generated texels (in act 213) in memory (e.g. memory 112). Thereafter, process 210 checks (in act 214) whether only one texel was generated in act 212 and stored in act 213, and if not, increments the level of detail L (in act 215) and returns to act 211 (described above). If only one texel was generated, then all mipmaps have been generated, and process 210 terminates, and at some later time process 220 (described above) is performed.

Note also that circuit 200 includes a number of single level trilinear circuits 200A–200D (FIG. 2B) for each one of the respective components of a texel: three colors (e.g. red, green, blue) and alpha. In the description, although only one such circuit, specifically circuit 200A is explicitly described, similar or identical description is applicable to the other circuits 200B–200D.

Figure 3A:
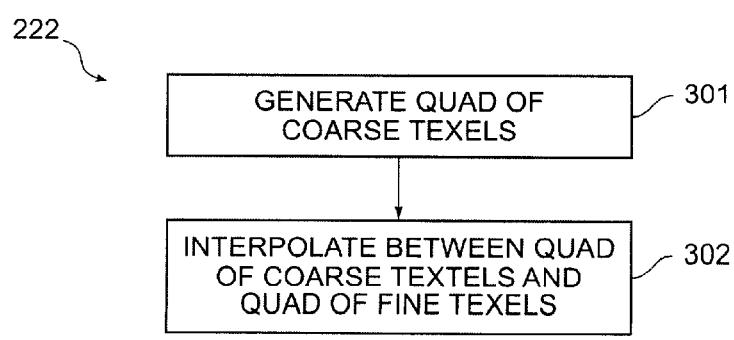
FIG. 3A illustrates, in an intermediate level flow chart, generation of a filtered texel by use of sixteen texels of FIG. 3B (described below).

In a first embodiment, circuit 200 and process 220 implement act 222 of process 220 by using the nearest texels 10–13 (FIG. 3B) and the surrounding texels 14–25 to generate (see act 301 in FIG. 3A) texels 26–29 at a coarser level of detail L+1, and thereafter using the generated texels 26–29 (also called "coarse texels") and the nearest texels 10–13 (also called "fine texels") to interpolate between LODs L and L+1 (see act 302 in FIG. 3A).

In this embodiment, coarse texels 26–29 (FIG. 3B) that are generated in act 301 are generated a second time (also referred to as "regenerated"), wherein the first time was during the generation of the initial set of mipmaps in act 212 of process 210 (FIG. 2C). Note that only coarse texels 26–29 in quad 30 (FIG. 3B) that is necessary for trilinear interpolation are generated in act 301 (FIG. 3A). Note further that the previously-generated coarse texels that are resident in memory 112 (FIG. 2B) are used only when regenerating even coarser texels (at level of detail L+2) for use in trilinear filtering (between levels L+1 and L+2).

Single level trilinear circuit 200A (FIG. 3C) of this embodiment includes a coarse texel generator 310 and an interpolation circuit 320. Coarse texel generator 310 performs the regeneration of coarse texels 26–29 (i.e., generation of the coarse texels a second time), and the resulting coarse texels 26–29 are used directly (without storage in main memory) by interpolation circuit 320 to perform trilinear filtering.

Coarse texel generator 310 has input terminals 311 and 312 (hereinafter "fine texel terminals") coupled to nearest texel bus 201 and to surrounding texel bus 202 respectively to receive therefrom the sixteen texels 10–25 (FIG. 3B) that are all at the level of detail L. Coarse texel generator 310 also has an output bus 313 (hereinafter "coarse texel bus") to carry away quad 30 (formed by coarse texels 26–29). Nearest texels 10–13 (received from the nearest texel bus) and the surrounding texels 14–25 (received from the surrounding texel bus) are used as four quads 31–34, wherein all four quads 31–34 are adjacent to each other and are from the level of detail L, and each of quads 31–34 touch at least two others of quads 31–34. As noted above, coarse texel generator 310 averages texels in each of the four quads 31–34, to form four coarse texels 26–29 that are supplied to coarse texel bus 313.

Interpolation circuit 320 has several groups of input terminals. A first group of input terminals 326–329 (hereinafter "coarse quad terminals") are coupled to the coarse texel bus 313 to receive the quad 30 of coarse texels 26–29. A second group of input terminals 321–324 (hereinafter "fine quad terminals") are coupled to the nearest texel bus 201 to receive a quad of nearest texels 10–13. A third group of input terminals 331–334 (hereinafter "coordinate terminals") are coupled to the coordinate input bus 203 (FIG. 2B) to receive therefrom the S and T coordinate fractions (also called "horizontal and vertical coordinate fractions") for the filtered texel. A fourth group of input terminals 335 (hereinafter "level of detail L terminals") are coupled to the level of detail bus 204. Interpolation circuit 320 also has output terminals 336 (hereinafter "filtered texel output terminals") that are coupled to the texel output bus 205 to supply thereto the filtered texel obtained by interpolation.

Specifically, interpolation circuit 320 performs trilinear interpolation between the four coarse texels 26–29 from the coarse texel generator 310 and four of the fine texels 10–13 (one fine texel from each of the four quads 31–34) by use of the S and T coordinate fractions and the level of detail fraction p to generate the filtered texel on the texel output bus 205. In one implementation interpolation circuit 320 includes a tree 350 of linear interpolators (also called "LIRPs") that interpolate the texel value based on the coordinates and the level of detail as follows. Specifically, a pair of linear interpolators (also called "first linear interpolators") 337 and 338 (FIG. 3C) are coupled to the coarse texel generator 310 to receive therefrom the four coarse texels 26–29 (FIG. 3B), and use the horizontal coordinate fraction Sc of the pixel projected in the coarse LOD to interpolate in the horizontal direction.

Another pair of linear interpolators (also called "second linear interpolators") 341 and 342 (FIG. 3C) are coupled to the nearest texel bus 201 to receive therefrom the four fine texels 10–13 (FIG. 3B), and use the horizontal coordinate fraction Sf of the pixel projected in the fine LOD to also interpolate in the horizontal direction. The tree 350 of linear interpolators also includes a linear interpolator (also called "third linear interpolator") 339 coupled to the pair of first linear interpolators 337 and 338, and another linear interpolator (also called "fourth linear interpolator") 343 coupled to the pair of second linear interpolators 341 and 342. Each of linear interpolators 339 and 343 interpolates in the vertical direction using the respective vertical coordinate fractions Tc and Tf of the pixel in the coarse and fine LODs.

The tree 350 also includes a LIRP (also called "fifth linear interpolator") 345 that is coupled to the LIRPs 339 and 343 to receive therefrom the bilinear filtered texels at the coarse and fine LODs. LIRP 345 uses the LOD fraction of the pixel to interpolate between the coarse and fine LODs. Note that one or more of the LIRPs described herein can be implemented in any manner well known in the art, e.g. as described in U.S. Pat. No. 5,402,533 granted to Kelley et al. that is incorporated by reference herein in its entirety.

In one variant of the first embodiment, a filter of the same order (e.g. a linear filter such as a box filter) is used in both generation and regeneration of coarse texels (in acts 212 and 301 of FIGS. 2C and 3A). Specifically, in this variant, coarse texel generator 310 (FIG. 3D) has four adders 314A–314D each of which is coupled to fine terminals 311 and 312 to receive a quad formed by one texel from nearest texel bus 201 and three texels from surrounding texel bus 202 as described above in reference to FIG. 3B. Each of adders 314A–314D (FIG. 3D) adds the four texels, and supplies the sum to one of shifters 315A–315D.

Figure 3B:
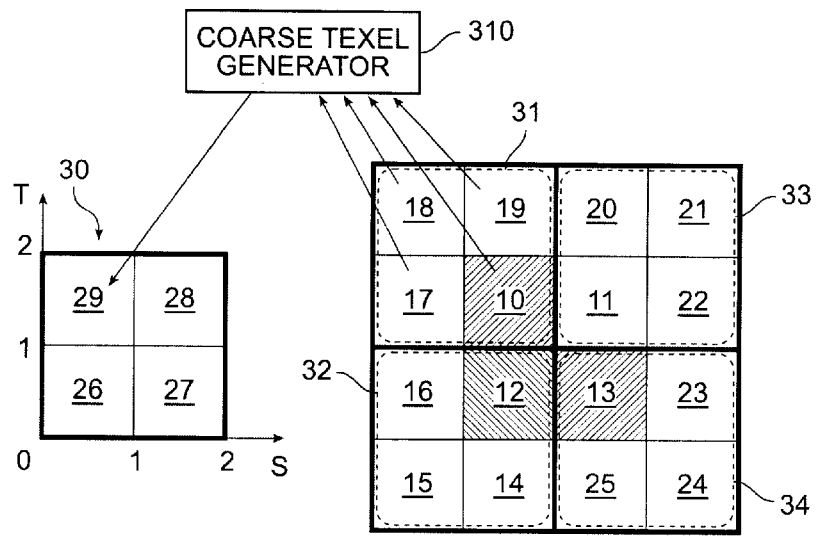
FIG. 3B illustrates grouping of the sixteen texels of FIG. 2A into four "quads" that can be individually averaged to generate the quad of coarse texels.
Figure 3C:
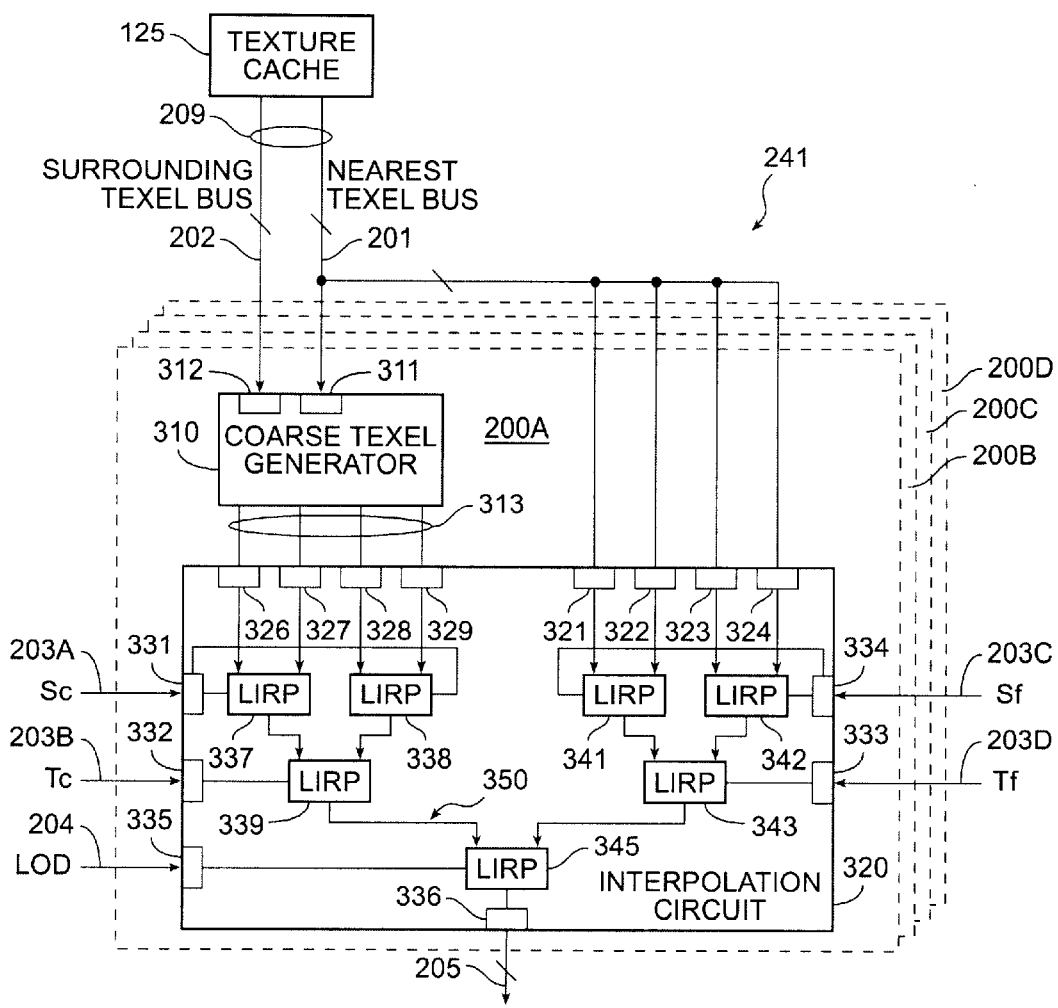
FIG. 3C illustrates, in an intermediate level block diagram, components included in a first embodiment of single level trilinear circuit 200 of FIG. 2B to implement act 222 illustrated in the flow chart of FIG. 3A.
Figure 3D:
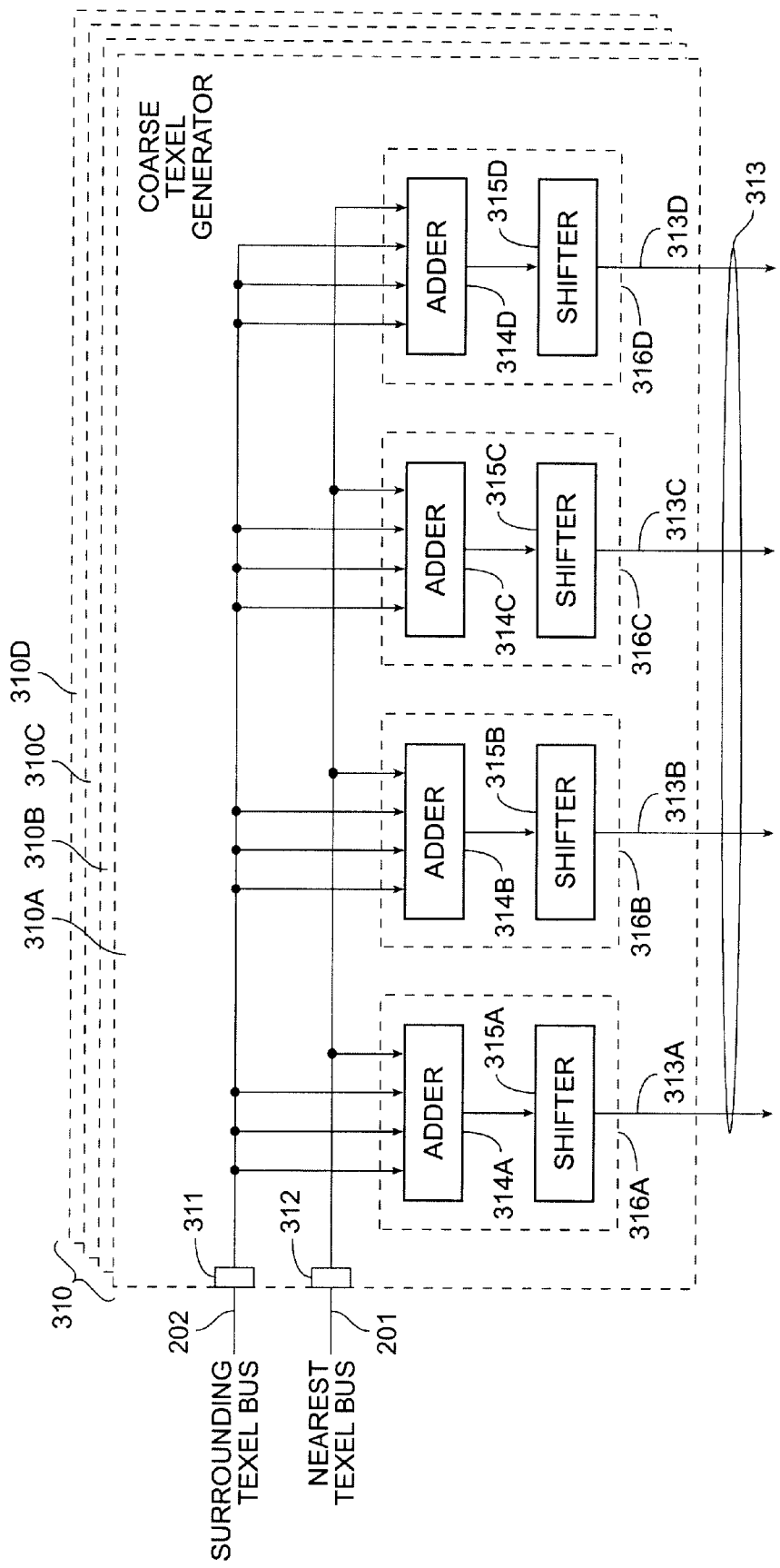
FIG. 3D illustrates, in a low level block diagram, coarse texel generator 310 illustrated in FIG. 3C.

Each of shifters 315A–315D is a two-bit shifter that right shifts the received sum by two bits, thereby to divide the sum by 4, to yield an averaged texel that represents a texel at a coarse level of detail L+1 (i.e., a coarse texel). Therefore, each of shifters 315A–315D supplies to the respective buses 313A–313D one of the coarse texels 26–29 (FIG. 3B). So, the four coarse texels 26–29 created by coarse texel generator 310 are identical to texels 26–29 that are obtained by linear averaging during generation of the initial set of mipmaps (i.e., the same box filter is used in both regeneration and generation).

Note that shifting of bits can be accomplished by appropriate connections of the wiring (e.g. by dropping the signals on the left bits and adding signals at logic level 0 as the right bits), without need for any logic or storage elements (e.g. gates) to implement a shifter. Moreover, each combination of adder and shifter (e.g. adder 314A and shifter 315A) can be combined into a single unit (e.g. arithmetic units 316A–316D). Such an arithmetic unit 316A can be implemented by circuitry other than adder 314A and shifter 315A shown in FIG. 3D, as would be apparent to a person skilled in designing digital circuits.

Figure 4A:
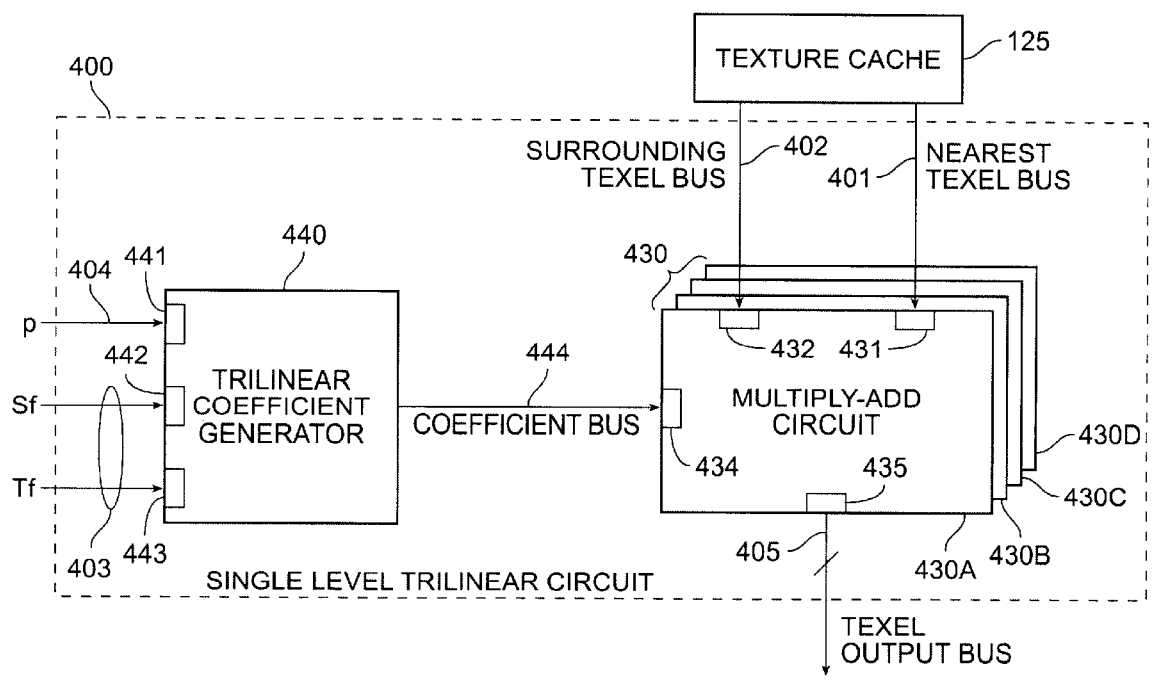
FIG. 4A illustrates, in an intermediate level block diagram, components included in a second embodiment of single level trilinear circuit 200 illustrated in FIG. 2B.

In a second embodiment, a single-level trilinear circuit 400 (FIG. 4A) and a process 410 (FIG. 4B) also use nearest texels 10–13 and surrounding texels 14–25 (FIG. 2A) at a single level of detail L directly to generate a filtered texel, without generation of the quad 30 (FIG. 3B) of coarse texels 26–29 at level of detail L+1 (as described above in reference to the first embodiment). In one variant of the second embodiment, single level trilinear circuit 400 includes a trilinear coefficient generator 440 (FIG. 4A) that uses texel coordinate fractions (received from coordinate input bus 403) and the level of detail fraction p (received from level of detail bus 404) to generate coefficients that are supplied on a coefficient bus 444.

Single level trilinear circuit 400 also includes a multiply-add circuit 430 (FIG. 4A) that receives the coefficients from bus 444. Circuit 430 uses the received coefficients with the nearest texels 10–13 (FIG. 4C) and surrounding texels 14–25 received from buses 401 and 402 (FIG. 4A) to generate the filtered texel on texel output bus 405. Note that buses 401–405 are identical to the corresponding buses 201–205 described above in reference to FIG. 2B. For example, buses 401 and 402 are coupled to cache memory 125 in the same manner as that described above in reference to buses 201 and 202.

In the second embodiment, trilinear coefficient generator 440 has a number of LOD terminals 441 that are coupled to the LOD bus 404, a number of horizontal coordinate terminals 442 and vertical coordinate terminals 443 that are coupled to the coordinate input bus 403 to receive therefrom the S and T coordinate fractions respectively. Trilinear coefficient generator 440 uses the received coordinate fractions and the level of detail fraction to generate (as illustrated by act 411 in FIG. 4B) coefficients that are supplied to coefficient bus 444. The generated coefficients are used for trilinear interpolation by the multiply-add circuit 430 as follows.

Specifically, multiply-add circuit 430 has coefficient input terminals 434 that are coupled to the coefficient bus 444 to receive the coefficients generated by trilinear coefficient generator 440. Multiply-add circuit 430 also has nearest texel terminals 431 and surrounding texel terminals 432 that are respectively coupled to the buses 401 and 402 thereby to receive the respective texels 10–13 and 14–25. Multiply-add circuit 430 multiplies certain coefficients from bus 444 with nearest texels 10–13 from bus 401 (as illustrated by act 412 in FIG. 4B). Multiply-add circuit 430 multiplies (as illustrated by act 414) the remaining coefficients from bus 444 with corresponding sums of groups of n texels (obtained by adding the n texels in each group as illustrated by act 413), and thereafter adds all products (as illustrated by act 415) to generate a filtered texel. Multiply-add circuit 430 supplies the filtered texel on output terminals 435 that are coupled to filtered texel bus 405.

Figures 4B, 4C, 4D:
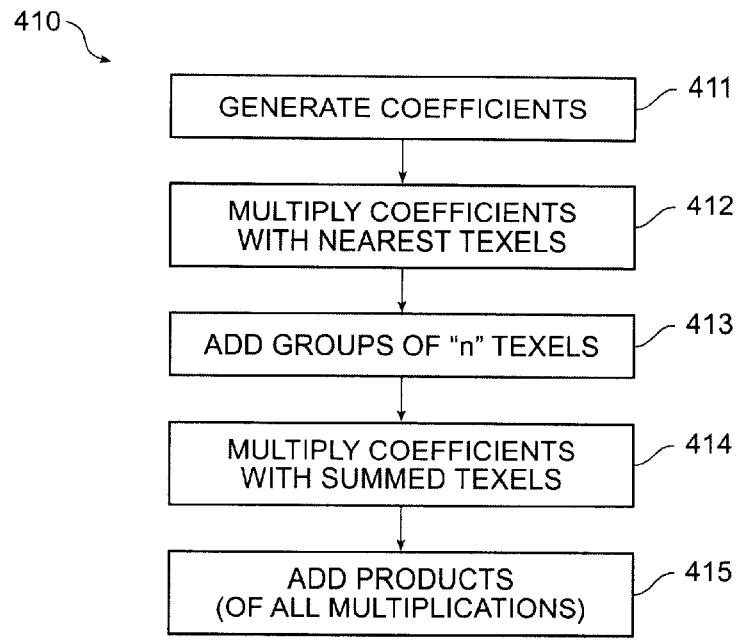
FIG. 4B illustrates, in an intermediate level flow chart, generation of a filtered texel by use of sixteen texels of FIG. 4C (described below).
FIGS. 4C and 4D illustrate two ways of grouping the texels of FIG. 2A for creation of summed texels that are used in multiplication with coefficients as illustrated in act 414 of FIG. 4B.
Figure 4E:
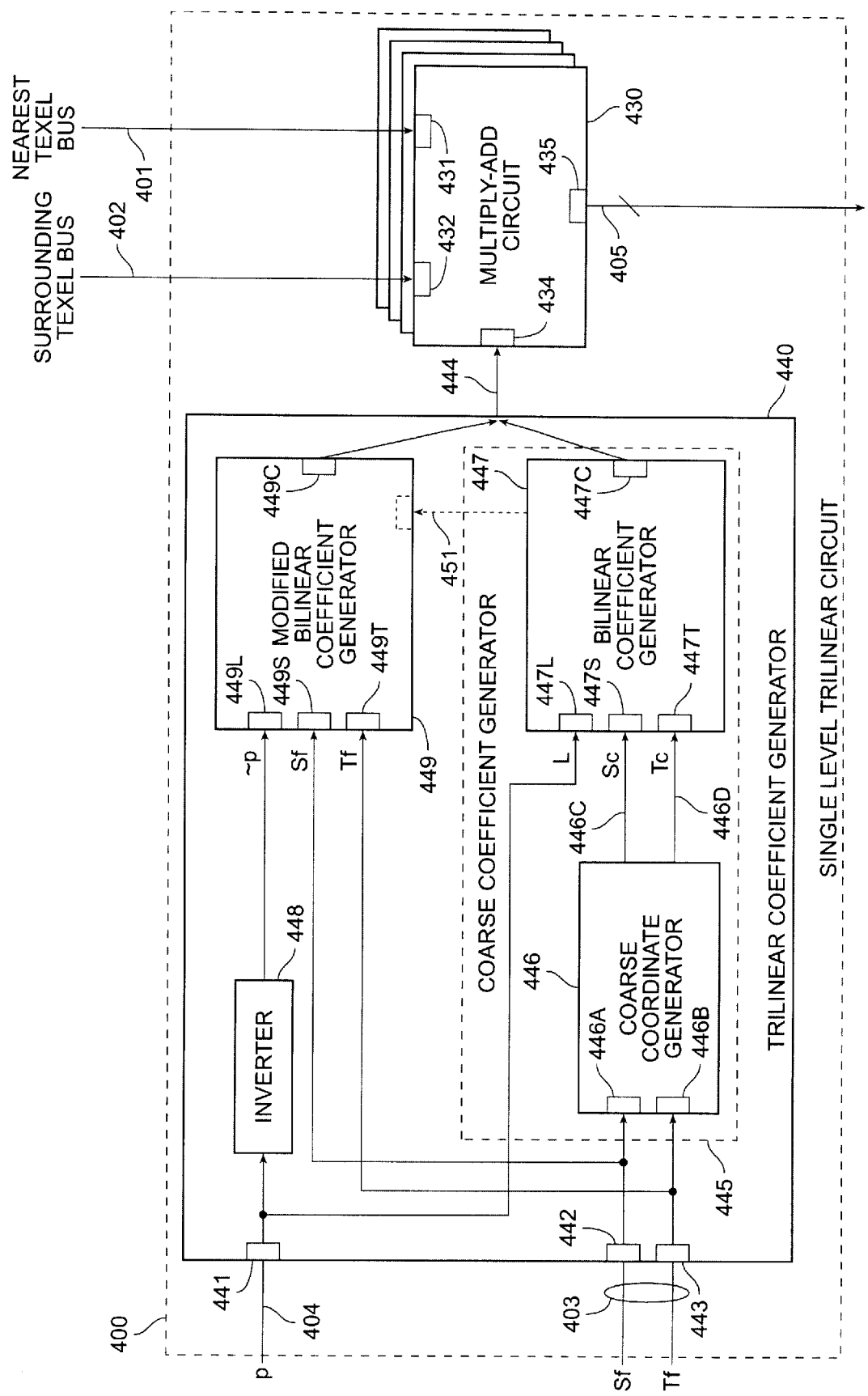
FIG. 4E illustrates, in another intermediate level block diagram, components included in one embodiment of a trilinear coefficient generator illustrated in FIG. 4A.

The specific coefficients that are generated in act 411 depend on the groups of texels being summed in act 413, and can be different in different implementations. For example, in a first implementation n=3 and texels 17–19 that touch a nearest texel 10 are summed (as illustrated in FIG. 4C), and in a second implementation n=4 and texels 17–19 and texel 10 are summed (as illustrated in FIG. 4D). In each of the two implementations (described below in reference to FIGS. 5A–5G and FIGS. 6A–6C respectively), a trilinear coefficient generator 440 has a coarse coordinate generator 446, two bilinear coefficient generators 447, 449 and an inverter 448 as illustrated in FIG. 4E and described in the following paragraphs. Note that in other implementations, trilinear coefficient generator 440 can have other structures and connections that would be apparent to the skilled digital circuit designer in view of the disclosure.

In one embodiment, trilinear coefficient generator 440 (FIG. 4E) includes a coarse coefficient generator 445 that is coupled to terminals 441–443 to receive therefrom the signals p, Sf and Tf, and that is coupled to coefficient bus 444 to supply thereto the following bilinear coefficients based on the coarse coordinates: pScTc, p(1−Tc)Sc, p(1−Sc)Tc, and p(1−Sc)(1−Tc). Coarse coefficient generator 445 includes a coarse coordinate generator 446 that has a horizontal coordinate input port 446A and a vertical coordinate input port 446B that are respectively coupled to the terminals 442 and 443. Coarse coordinate generator 446 also has a horizontal coordinate output bus 446C and a vertical coordinate output bus 446D that respectively carry the coarse coordinates Sc and Tc generated therein (i.e., by coarse coordinate generator 446). Coarse coordinate generator 446 can be implemented in any manner, e.g. as described below in reference to FIG. 5D.

Coarse coefficient generator 445 also includes a bilinear coefficient generator 447 that has coordinate input terminals 447S and 447T coupled to the respective horizontal and vertical coordinate output buses 446C and 446D of generator 446. Bilinear coefficient generator 447 also has LOD terminals 447L that are coupled to terminals 441, and output terminals 447C that are coupled to bus 444. Bilinear coefficient generator 447 supplies, to bus 444, bilinear coefficients (normally used for bilinear filtering) in response to receipt of the signals p, Sc and Tc.

In addition to coarse coefficient generator 445, trilinear coefficient generator 440 also includes an inverter 448 and a modified bilinear coefficient generator 449 that together generate additional coefficients for coefficient bus 444. Inverter 448 is coupled to terminals 441 to receive therefrom the level of detail fraction p, and supplies to modified bilinear coefficient generator 449 the inverted signal ~p that is converted to (1−p) for use as a multiplicand as described below. Modified bilinear coefficient generator 449 is coupled to coordinate input bus 403 via terminals 442 and 443 and receives therefrom the coordinate signals Sf and Tf. The circuitry in modified bilinear coefficient generator 449 is different depending on whether or not an optional bus 451 couples the two bilinear coefficient generators 447 and 449.

Figure 5A:
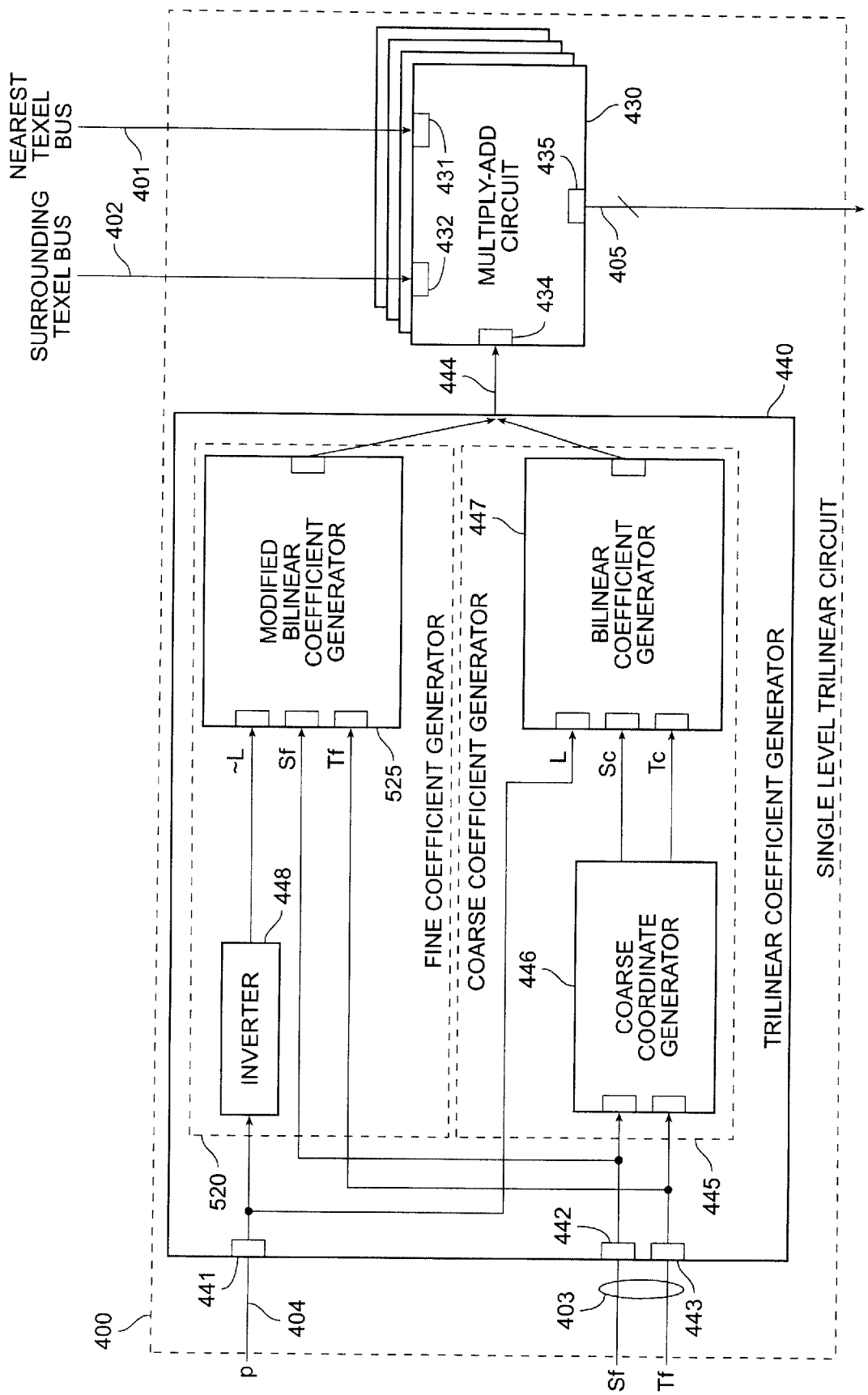
FIG. 5A illustrates, in another intermediate level block diagram, another embodiment of the trilinear coefficient generator of FIG. 4A.
Figure 5B:
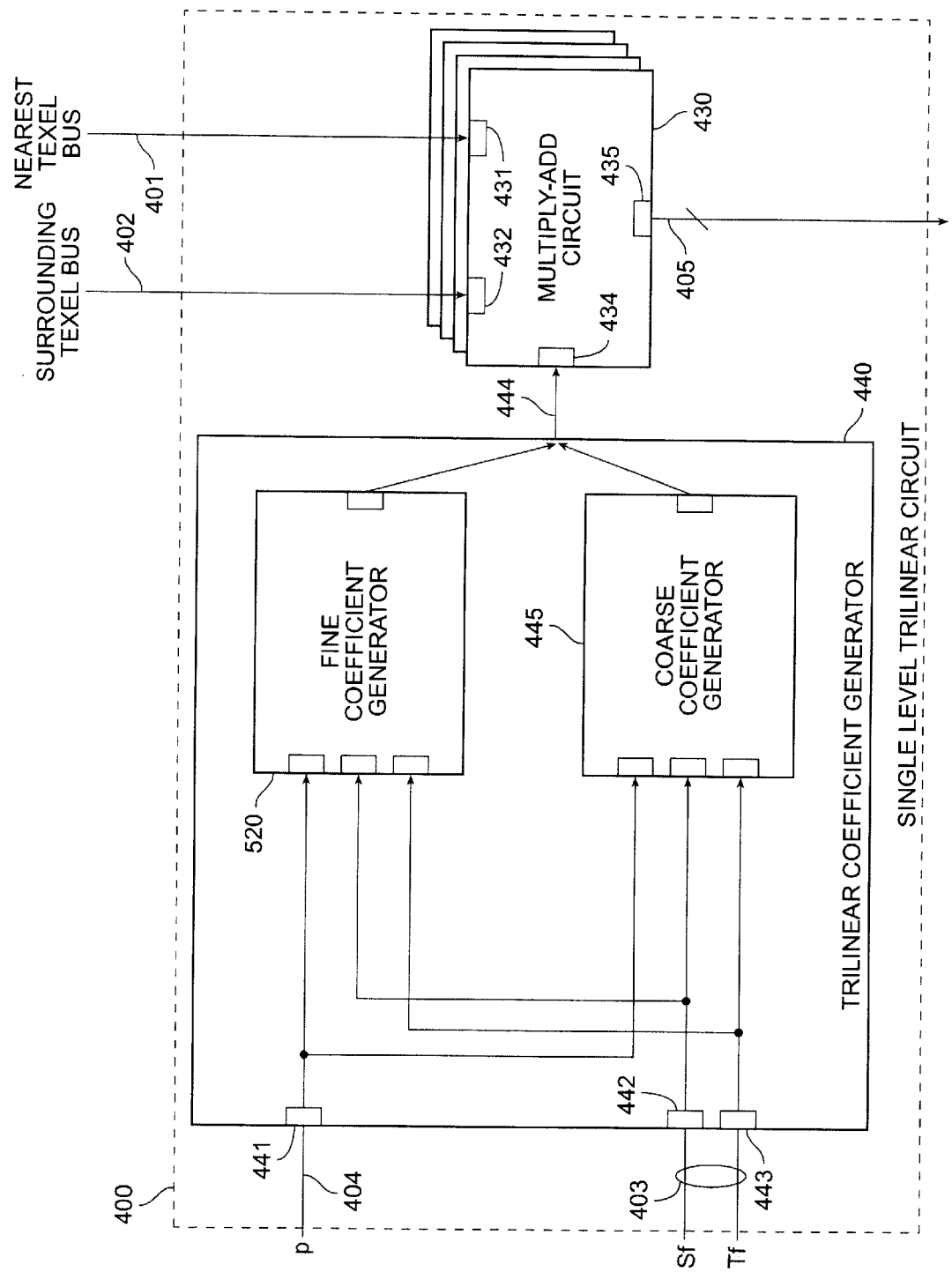
FIG. 5B illustrates a trilinear coefficient generator implemented by a fine coefficient generator 520 and a coarse coefficient generator 445.
Figure 5C:
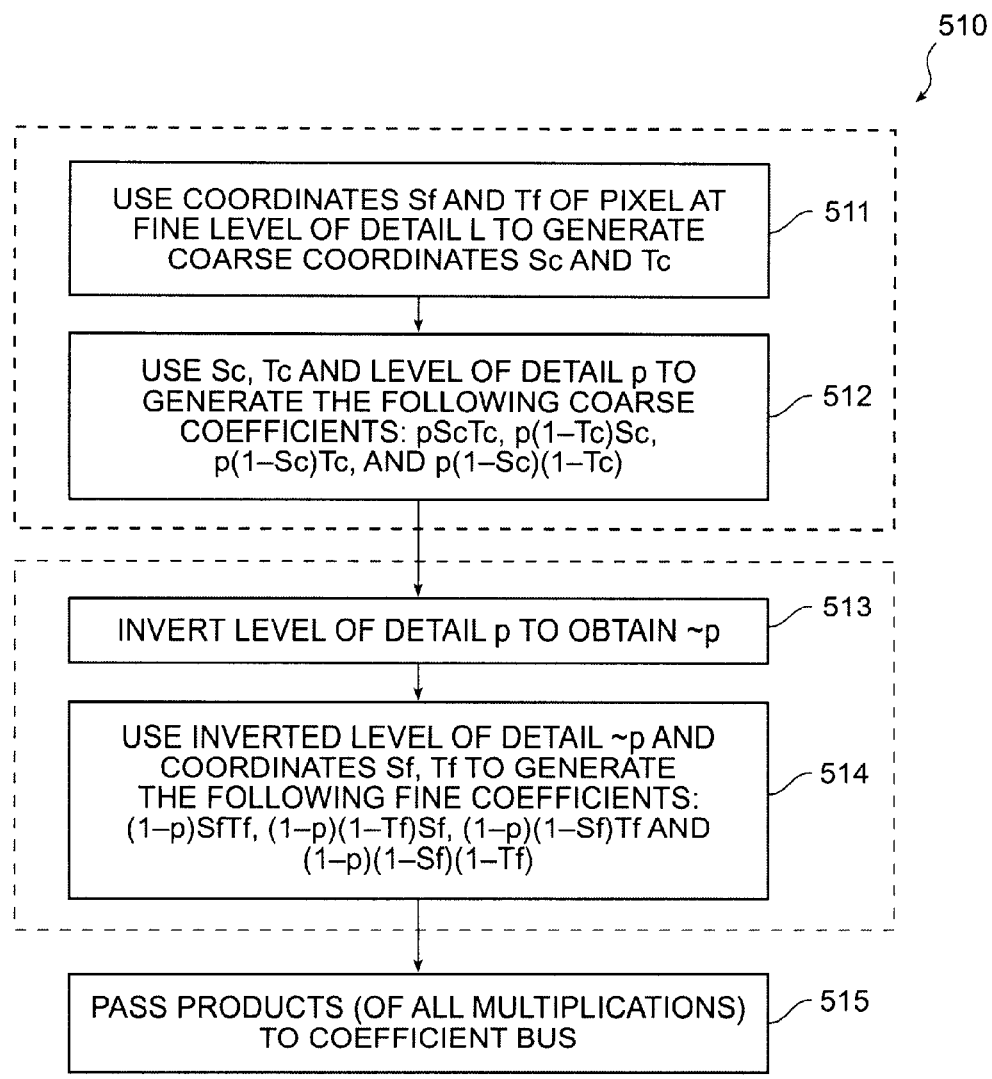
FIG. 5C illustrates, in a flow chart, acts performed by the trilinear coefficient generator of FIG. 5A.
Figure 5D:
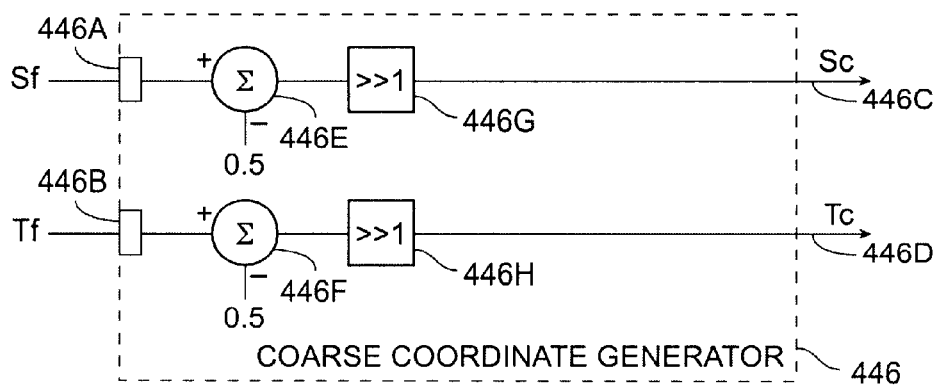
FIG. 5D illustrates, in a low level block diagram, a coarse coordinate generator included in the coarse coefficient generator illustrated in FIG. 5A.

Specifically, in one implementation, a modified bilinear coefficient generator 525 (FIG. 5A) is not coupled to bilinear coefficient generator 447, and instead modified bilinear coefficient generator 525 and inverter 448 together form a fine coefficient generator 520 (FIG. 5B). Fine coefficient generator 520 inverts the level of detail p to obtain ~p (as illustrated in act 513 in FIG. 5C), and uses the inverted level of detail and fine coordinate fractions Sf and Tf to generate (as illustrated by act 514) the following fine bilinear coefficients: (1−p) Sf Tf, (1−p)(1−Tf) Sf, (1−p)(1−Sf)Tf, and (1−p)(1−Sf)(1−Tf). Therefore, fine coefficient generator 520 uses fine coordinate fractions Sf and Tf to generate coefficients in a manner similar to coarse coefficient generator 445, as illustrated by acts 511 and 512 of a process 510 (FIG. 5C). In act 515, trilinear coefficient generator 440 passes all coefficients to coefficient bus 444.

Note that although illustrated in the context of a modified coefficient generator 449 (FIG. 5A), fine coefficient generator 520 (FIG. 5B) can be implemented by any other circuitry that is apparent to the skilled digital circuit designer in view of the disclosure.

In one implementation, coarse coordinate generator 446 (FIG. 5D) includes adders 446E and 446F that respectively subtract 0.5 from the fine texel coordinates Sf and Tf. The resulting values are right shifted by one bit and supplied as coarse coordinate fractions Sc and Tc on buses 446C and 446D. Therefore coarse coordinate generator 446 generates a coarse coordinate in accordance with the equation Coarse= ((Fine +0.5)>>1)−0.5 by implementing the equation Coarse=(Fine−0.5)>>1, where "Coarse" is any of coarse coordinates Sc and Tc and "Fine" is any of fine coordinates Sf and Tf. Note that coarse coordinate generator 446 can be implemented by a circuit other than the circuit in FIG. 5D in view of the disclosure. Buses 446C and 446D are coupled to coordinate input terminals 447S and 447T of bilinear coefficient generator 447 (FIG. 5E).

Figure 5E:
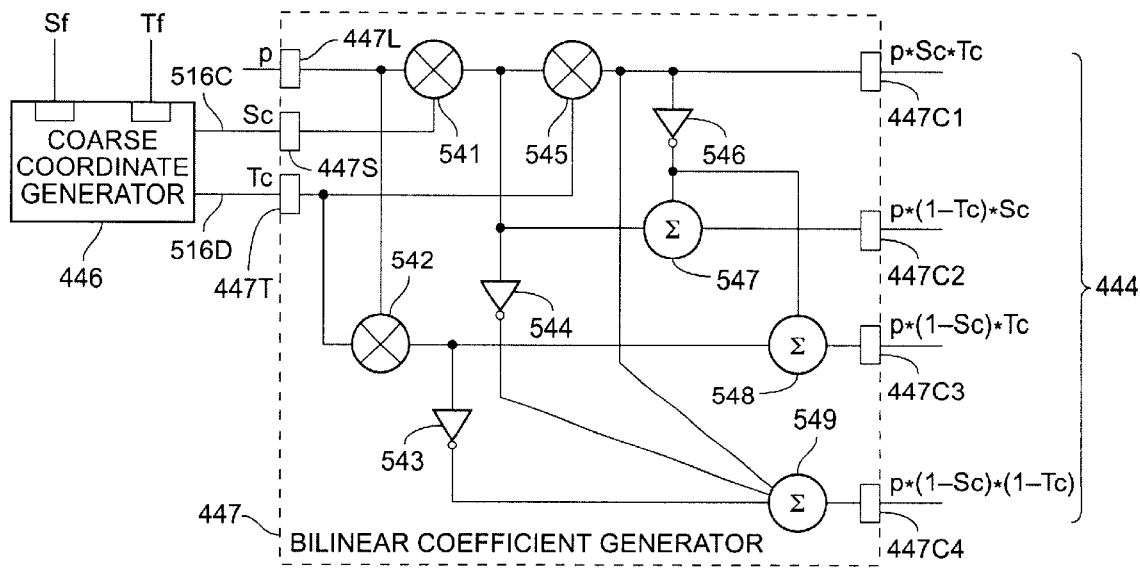
FIGS. 5E and 5F illustrate, in low level block diagrams, two bilinear coefficient generators that are respectively included in the coarse coefficient generator and the fine coefficient generator illustrated in FIG. 5A.
Figure 5F:
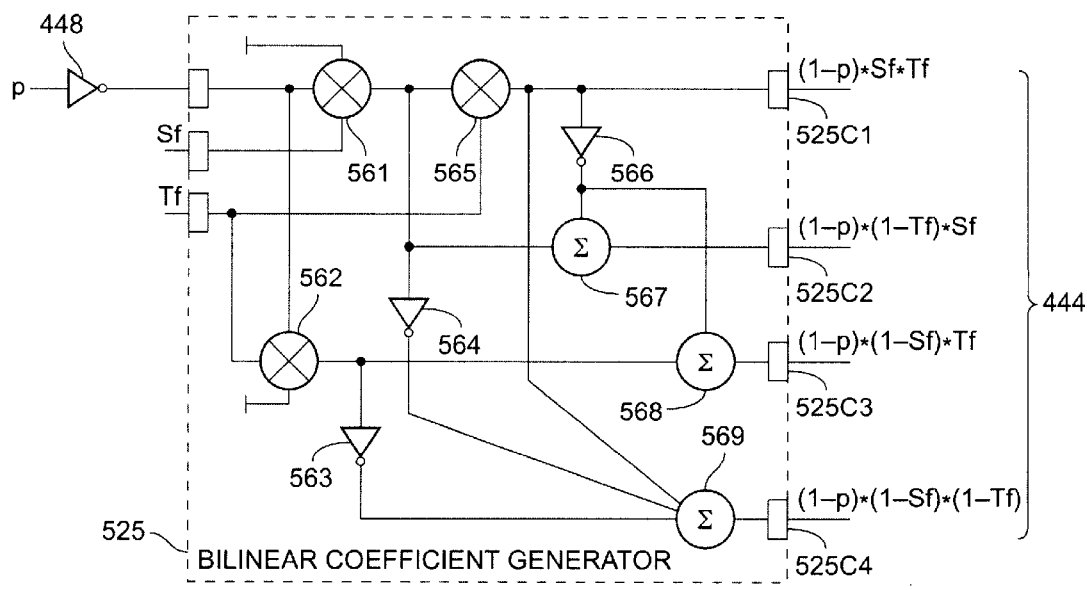
Figure 5G:
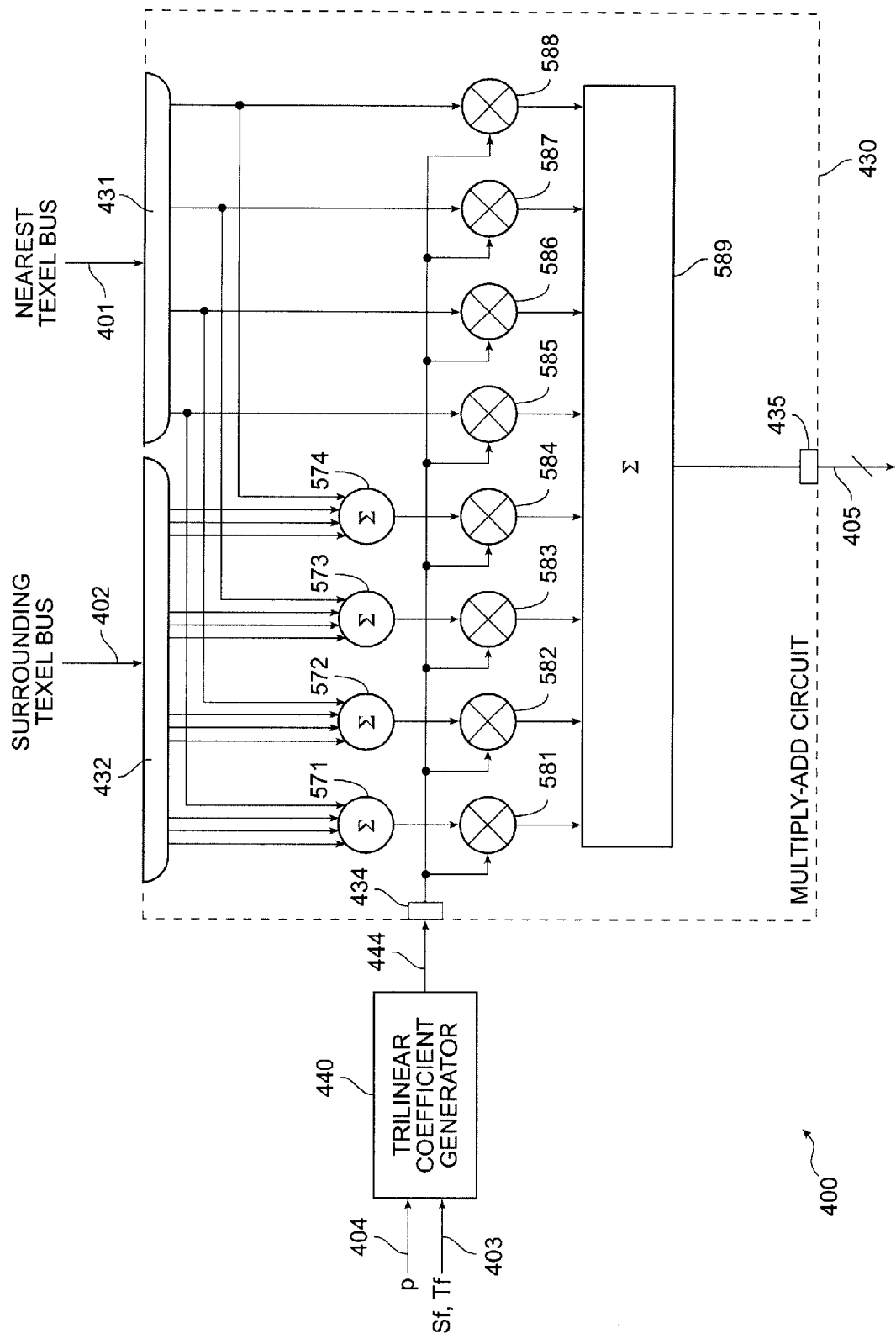
FIG. 5G illustrates, in a low level block diagram, components in a multiply-add circuit included in one implementation of the single level trilinear circuit illustrated in FIG. 5A.

In an implementation illustrated in FIG. 5E, bilinear coefficient generator 447 includes two multipliers 541 and 542 that are each coupled to the respective coordinate terminals 447S and 447T to receive therefrom a coordinate fraction as a multiplicand. Multipliers 541 and 542 are also coupled to terminals 447L to receive therefrom fractional level of detail p as another multiplicand. Output terminals of multiplier 541 are coupled to another multiplier 545. Output terminals of all multipliers 541, 542, and 545 are coupled either directly or via inverters 543, 544 and 546 and adders 547–549 to terminals 447C1–447C4 that supply the coarse coefficients to bus 444.

In this implementation, bilinear coefficient generator 525 (FIG. 5F) is identical to the just-described bilinear coefficient generator 447 except for the following difference. Multipliers 561 and 562 are identical to multipliers 541 and 542 except that a logic value of "1" is added therein to the inverted signal --p at the least significant bit (LSB) position, so that the multiplicand is multiplied by (1−p). The products of these multiplications are provided on terminals 525C1–525C4 that together with terminals 447C1–447C4 (described above) are coupled to bus 444 (FIG. 5A). Note that in other implementations, other structures are used to generate these coefficients or other such coefficients.

Multiply-add circuit 430 (FIG. 5G) includes four adders 571–574 that are coupled to the surrounding texel bus 402 (via terminals 432) to receive therefrom three surrounding texels, and to nearest texel bus 401 (via terminals 431) to receive therefrom a nearest texel. For example, adder 531 receives surrounding texels 17–19 (FIG. 4D), and nearest texel 10, whereas adder 532 receives surrounding texels 20–22 and nearest texel 11.

Each of adders 571–574 adds the three surrounding texels and one nearest texel, and supplies the sum to one of multipliers 581–584 that are included multiply-add circuit 430. Therefore, each of multipliers 581–584 is coupled to an adder in the group of adders 571–574. Multiply-add circuit 430 also includes additional multipliers 585–588 that are directly coupled to the nearest texel bus 401 to receive therefrom the nearest texels 10–13 (FIG. 4B). Each of multipliers 581–588 (FIG. 5F) is coupled to coefficient bus 444 (via terminals 434) and multiplies the received signal with an appropriate one of coefficients generated by coefficient generator 440, and adder 589 adds the products, thereby to generate a filtered texel in accordance with the following formula:

Filtered texel=(Tex00+Tex01+Tex10+Tex11)/4*$p$*(1−$Tc$)*(1−$Sc$)+

(Tex20+Tex30+Tex31+Tex21)/4*$p$*(1−$Tc$)*$Sc$+

(Tex03+Tex13+Tex02+Tex12)/4*$p$*$Tc$*(1−$Sc$)+

(Tex23+Tex33+Tex32+Tex22)/4*$p$*$Tc$*$Sc$+

(Tex11)*((1−$Tf$)*(1−Sf)*(1−$p$))+

(Tex21)*($Sf$*(1−$Tf$)*(1−$p$))+

(Tex12)*($Tf$*(1−$Sf$)*(1−$p$))+

(Tex22)*($Tf$*$Sf$*(1−p))

Figure 6A:
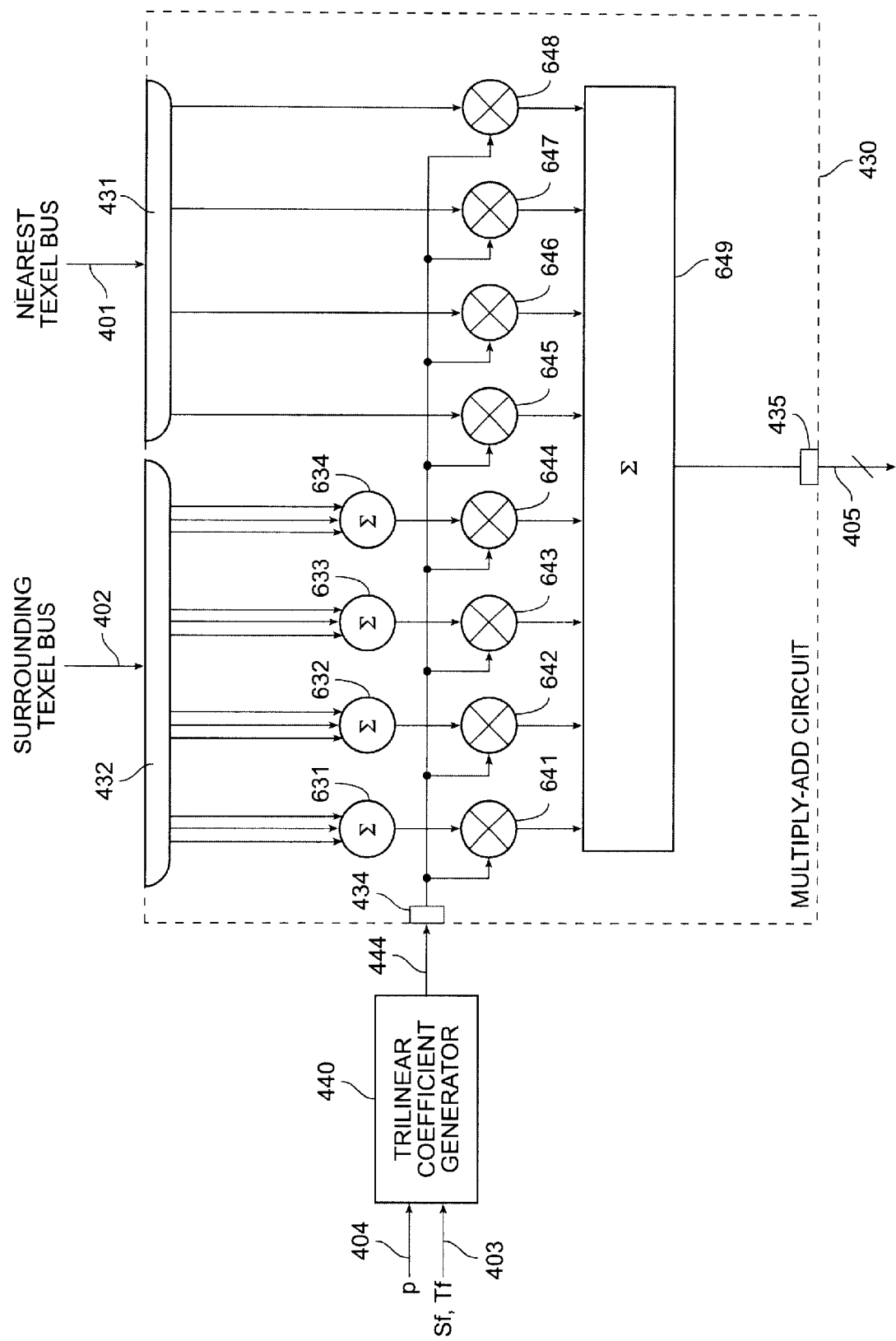
FIG. 6A illustrates, in a low level block diagram, components in a multiply-add circuit included in another implementation of the single level trilinear circuit illustrated in FIG. 4E.
Figure 6B:
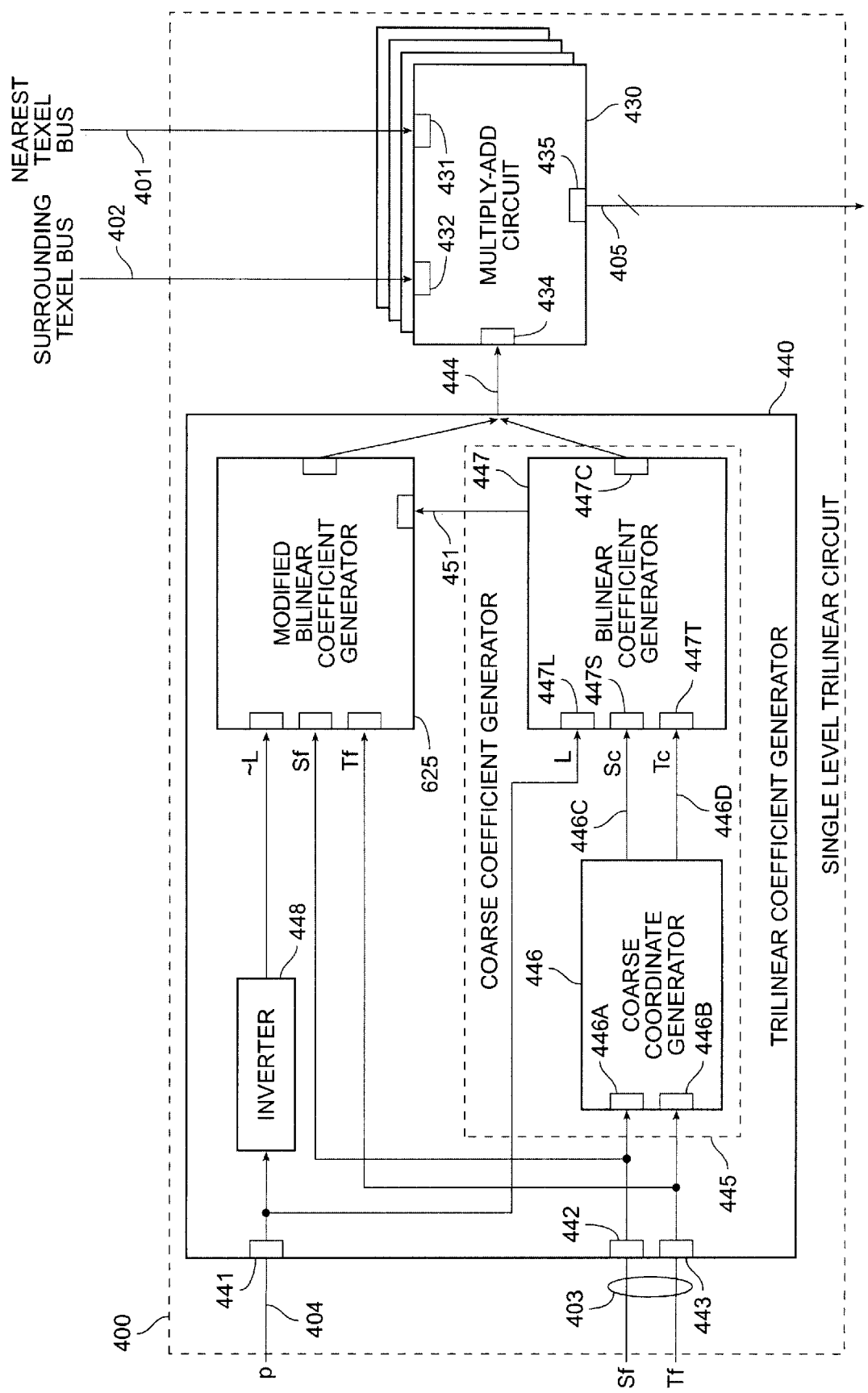
FIG. 6B illustrates, in an intermediate level block diagram, another embodiment of the trilinear coefficient generator of FIG. 4E that has a bus 451 for transferring coefficients between the two bilinear coefficient generators 447 and 625.
Figure 6C:
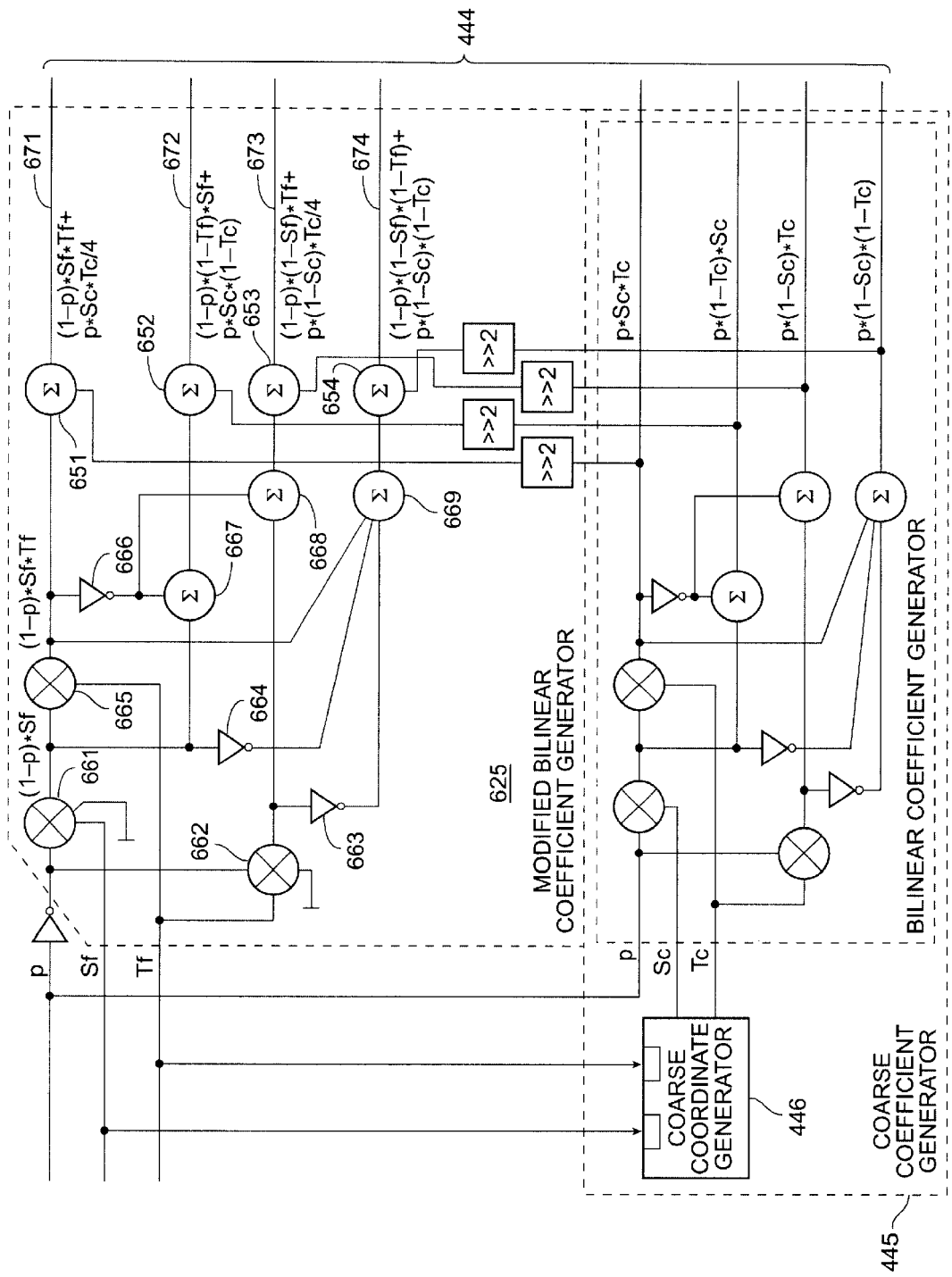
FIG. 6C illustrates, in a low level block diagram, a modified bilinear coefficient generator included in an embodiment of the trilinear coefficient generator of FIG. 6B.

In an alternative implementation of the multiply-add circuit 430 (FIG. 6A), each of adders 631–634 receives only three texels (surrounding texels). Multipliers 641–648 and adder 649 are connected in a manner similar or identical to the corresponding multipliers 581–588 and adder 589 (described above in reference to FIG. 5G). In this implementation, trilinear coefficient generator 440 performs acts that are identical to acts 511–515 (described above in reference to FIG. 5C), except for act 514 wherein coefficients from act 512 are used to generate different coefficients (as illustrated in FIG. 6B). In FIG. 6B, coarse coefficient generator 445 is identical to the corresponding implementation illustrated in FIG. 5B, and generates the same coefficients. Modified bilinear coefficient generator 625 (FIG. 6C) includes items 661–669 that are identical to and are connected in an identical manner as items 541–549 and 561–569 (described above in reference to FIGS. 5E and 5F), and in addition includes a number of adders 651–654 that are respectively coupled to output buses 671–674. Adders 651–654 add to the signals being supplied on buses 671–674 the respective signals being generated by coarse coefficient generator 445. Therefore, modified coefficient generator 625 generates a set of coefficients in accordance with the following formula:

Filtered texel=(Tex00+Tex01+Tex10)/4*$p$*(1−$Tc$)*(1−$Sc$)+

(Tex20+Tex30+Tex31)/4*$p$*(1−$Tc$)*$Sc$+

(Tex03+Tex13+Tex02)/4*$p$*$Tc$*(1−$Sc$)+

(Tex23+Tex33+Tex32)/4*$p$*$Tc$*$Sc$+

(Tex11)*((1−$Tf$)*(1−$Sf$)*(1−$p$)+(1−$Tc$)*(1−$Sc$)*$p$/4)+

(Tex21)*($Sf$*(1−$Tf$)*(1−$p$)+$Tc$*(1−$Sc$)*$p$/4)+

(Tex12)*($Tf$*(1−$Sf$)*(1−$p$)+$Tc$*(1−$Sc$)*$p$/4)+

(Tex22)*($Tf$*$Sf$*(1−$p$)+$Tc$*$Sc$*$p$/4)

In one embodiment, cache memory 125 (FIG. 2B) includes two distinct memories (shown in FIG. 7A): a first cache 701 (hereinafter "texture cache") that holds texels in the normal manner, and a second cache 702 (hereinafter "used texel cache") that temporarily buffers the most recently used texels to reduce the width of the bus from first cache 701 otherwise required to supply sixteen texels per clock. Specifically, used texel cache 702 stores texels from texture cache 701 as they are read for use in single level trilinear circuit 200, and supplies the stored texels as and when necessary for rendering.

In this embodiment, first cache 701 is implemented as a static random-access-memory (SRAM), and second cache 702 (hereinafter "used texel cache") is implemented as a group of storage elements e.g. latches or registers. Used texel cache 702 can be, e.g. a pipeline that has eight storage elements, with access to all elements. Used texel cache 702 eliminates the need for an SRAM to supply sixteen texels per clock, because eight texels can be supplied by each of caches 701 and 702 (with a latency of 1 clock required to load used texel cache 702).

Moreover, used texel cache 702 allows the SRAM for cache 701 to have a better layout efficiency or lower gate count than otherwise required (if the SRAM supplies 16 texels per clock). Specifically, when implementing cache 701 as a single wide SRAM, the layout efficiency is poorer (than an SRAM having the same number of elements that is half as wide). Alternatively, when implementing cache 701 as two SRAMs, gates included in address decode logic for cache 701 are doubled. Therefore, use of two caches 701 and 702 as described herein is better.

Figures 7A, 7B:
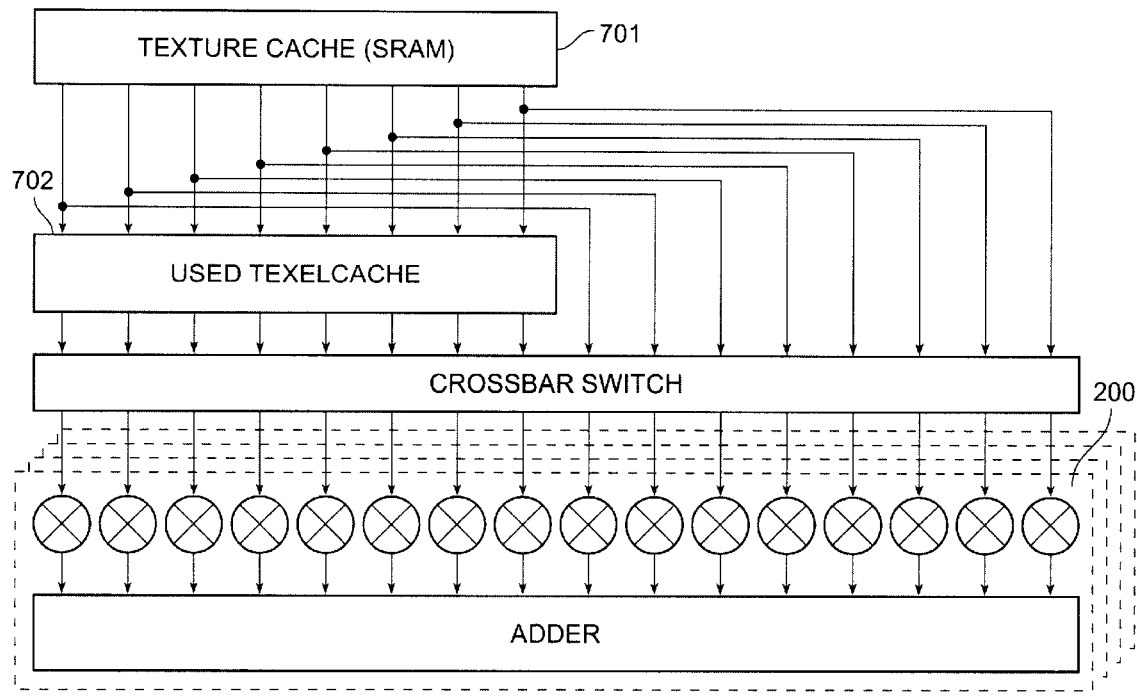
FIG. 7A illustrates two caches 701 and 702 that are coupled by a crossbar switch to the single level trilinear circuit 200 illustrated in FIG. 2B.
FIGS. 7B and 7C illustrate, the arrangement of texels held in a pipelined implementation of a cache 702 of FIG. 7A at two specific moments respectively.

Used texel cache 702 takes advantage in locality of access of texels caused by the overlap in texels requested during processing of adjacent texels. In one example, rendering a triangle requires use of the texture illustrated in FIG. 7B. In this example, the triangle has a width less than 8 pixels, and scanning starts from top left of the triangle, and moves from left to right and top to bottom. Specifically, rendering of a first pixel pix0 of the triangle requires texels Tex00–Tex33 (shown hatched in FIG. 7B), wherein Tex11, Tex12, Tex21 and Tex22 are nearest texels, and the remaining texels are surrounding texels. Similarly, rendering of a second pixel requires texels Tex10–Tex43 (shown hatched in FIG. 7C). Note that all texels in FIGS. 7B and 7C are labeled with the respective S and T coordinates.

Figures 7C, 7D:
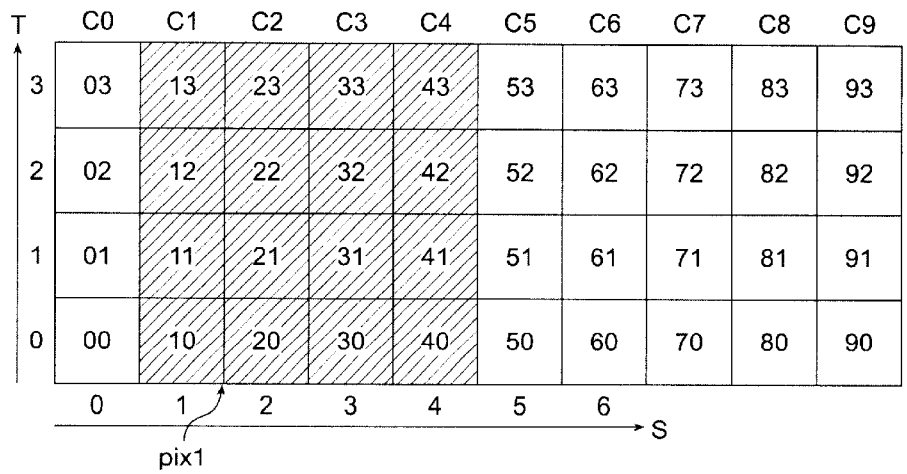
FIG. 7D illustrates, in a table, the presence of texels in various cache lines of the used texel cache of FIG. 7A.

Used texel cache 702 and texture cache 701 function together to supply sixteen texels/clock to the rendering subsystem as illustrated in FIG. 7D. In FIG. 7D, the numbers in bold indicate texels being supplied to the rendering subsystem. Initially, all storage location in used texel cache 702 are empty, indicated by "X." Thereafter, in clock 1, texels Tex00–Tex13 in the leftmost two columns C0 and C1 are stored in a first storage element in used texel cache 702. Therefore, in clock 2, texels Tex00–Tex13 of columns C0 and C1 are supplied by cache 702, while texels 20–33 in the two adjacent columns C2 and C3 are supplied by cache 701. At the same time texels Tex20–Tex33 of columns C2 and C3 are stored in cache 702.

Next, in clock 3, texels Tex10–Tex23 of columns C1 and C2 are supplied from cache 702 and texels Tex30–Tex43 of columns C3 and C4 are supplied from cache 701. Note that although texels Tex30–Tex33 of column C3 are present in cache 702, cache 701 is selected to supply texels Tex30–Tex33 in clock 3 because used texel cache 702 can supply at most eight texels/clock. Moreover, in clock 3, only texels Tex40–Tex43 of column C4 are stored in cache 702 because the remaining texels provided by cache 701 (texels Tex30–Tex33) were previously stored in cache 702.

Similarly, in clock 4, texels Tex20–Tex33 of columns C2 and C3 are supplied from cache 702 and texels Tex40–Tex53 of columns C4 and C5 are supplied from cache 701. Again, texels Tex50–53 of column C5 are stored in cache 702. In this manner, cache 702 reduces the width of SRAM that is otherwise required to implement cache 701 (and the related bus) that generates sixteen words per clock. Note that although a pipeline implementation of cache 702 has been discussed above, other implementations have other structures for cache 702.

Addresses for the sixteen texels used to render a single pixel can be supplied to cache 125 in any manner well known in the art. One embodiment for providing texel addresses to cache 125 is illustrated by VERILOG descriptions in the attached microfiche Appendices A and B, and documentation in microfiche Appendix C (all appendices being incorporated by reference herein in their entirety). As illustrated in Appendices A–C and in FIG. 8A, graphics pipeline 801 merely specifies the S and T coordinates of one texel on a bus that is coupled to a texture cache subsystem 120. Note that the attached VERILOG descriptions are limited to the use of a quad for bilinear filtering, and need to be modified to include the use of 4×4 texels for trilinear filtering as described herein. The modifications to VERILOG descriptions are well within the skill of a circuit designer in view of the disclosure.

Graphics pipeline 801 (FIG. 8A) specifies S and T coordinates only in response to an active signal on a ready line from subsystem 120, thereby to allow subsystem 120 to take as long as necessary to process a given pair of S and T coordinates. Subsystem 120 may take different amounts of time to process a given pair of S and T coordinates, depending on, e.g. whether all texels are in a single cache line.

Cache address generator 126 (FIG. 8A) uses a bilinear/ trilinear mode and a minification flag from graphics pipeline 801 to determine whether bilinear filtering or trilinear filtering is to be performed. If minification flag is clear, cache address generator 126 generates indices of cache lines that contain a quad of texels for bilinear filtering. If minification flag is set and if bilinear/trilinear mode indicates trilinear, cache address generator 126 generates indices of cache lines that contain sixteen texels (also referred to as "four-by-four" and abbreviated as "4×4") for trilinear filtering.

Depending on the position of the quad or 4×4 texels relative to the cache lines, one, two or four cache lines may be identified by cache address generator 126. Specifically, there are four types of relative positions: in type A position the quad or the 4×4 is completely contained within a cache line, as illustrated by quad 821 in FIG. 8B; in type B position, the quad or the 4×4 straddles a vertical edge of the cache line, as illustrated by quad 822 in FIG. 8B and 4×4 832 in FIG. 8C; in type C position, the quad or the 4×4 straddles a horizontal edge of the cache line, as illustrated by quad 823 in FIG. 8B and 4×4 833 in FIG. 8C; in type D position, the quad or the 4×4 (also called "four-by-four") straddles a corner of the cache line, as illustrated by quad 824 in FIG. 8B and four-by-four 834 in FIG. 8C.

Cache address generator 126 determines the position type of quad or 4×4 by simply checking if the two least significant bits of the S and T coordinates satisfy any of the following conditions.

For example, for a quad formed by 32 bit texels (see FIG. 8B):

If (S[1:0]==3) and (T[1:0]==3) then type is D, e.g. quad 824

If (S[1:0]=/=3) and (T[1:0]==3) then type is C, e.g. quad 823

If (S[1:0]==3) and (T[1:0]=/=3) then type is B, e.g. quad 822

If (S[1:0]=/=3) and (T[1:0]=/=3) then type is A, e.g. quad 821

For example for a four-by-four formed by 32 bit texels (see FIG. 8C):

If (S[1:0]==1) and (T[1:0]==1) then type is A

If (S[1:0]=/=1) and (T[1:0]==1) then type is B, e.g. four-by-four 832

If (S[1:0]==1) and (T[1:0]=/=1) then type is C, e.g. four-by-four 833

If (S[1:0]=/=1) and (T[1:0]=/=1) then type is D, e.g. four-by-four 834

Note that "=/=" indicates "not equal". Note also that 4×4 and quad are both fully specified by the position type and the S and T coordinates of one texel. The addresses of each texel in a quad or a 4×4 are computed by cache controller 815 as illustrated in map 835 in FIG. 8D. Specifically, in case of a quad, the texel addresses are (S,T), (S+1, T), (S,T+1) and (S+1, T+1). Similarly, in case of a 4×4, the addresses range from (S−1, T−1) to (S+2, T+2).

On every clock, cache address generator 126 (FIG. 8A) passes to cache manager 811 the position type of the quad (or of the 4×4) being addressed, and also passes a maximum of two indices (cache line indices in case of direct mapped or set indices in case of a n-way set associative cache). Specifically, in case of type A, cache address generator 126 generates only one index, for the first cache line that contains the texel at the S and T coordinates; in case of types B, C and D, cache address generator 126 generates two indices in a first clock, and in case to type D two additional indices in the next clock.

Cache manager 811 determines if a cache line indicated by an index from cache address generator 126 is present in cache memory 125 (by checking an internal table). Cache manager 811 passes a hit/miss signal to each of fetch request generator 812 and address packer 813. If the hit/miss signal is inactive (indicating a miss), fetch request generator 812 generates a fetch signal to memory 112 thereby to cause the missing texels to be loaded into cache 125.

Figure 8A:
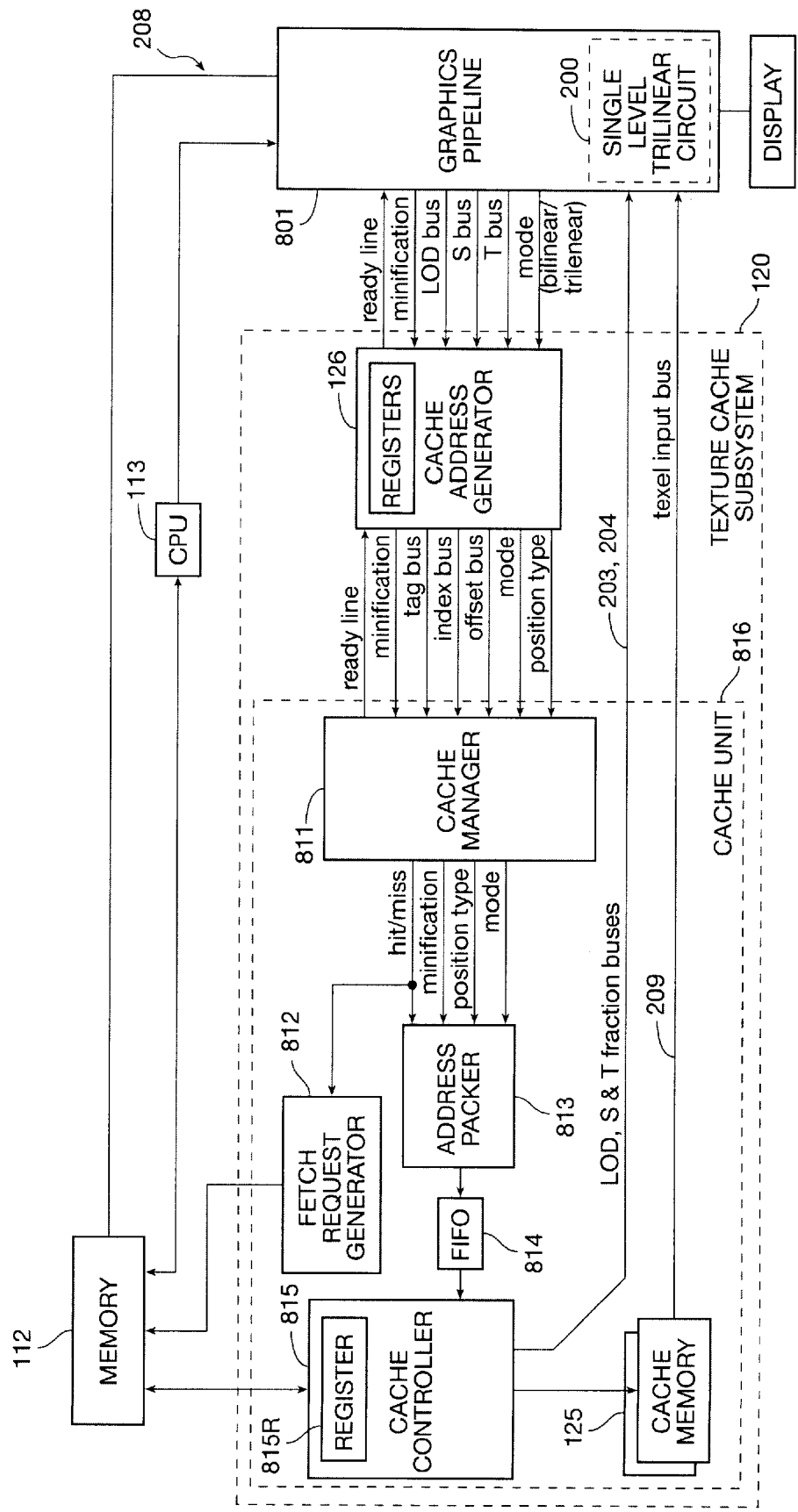
FIG. 8A illustrates various components in a texture cache subsystem in one embodiment.
Figure 8E:
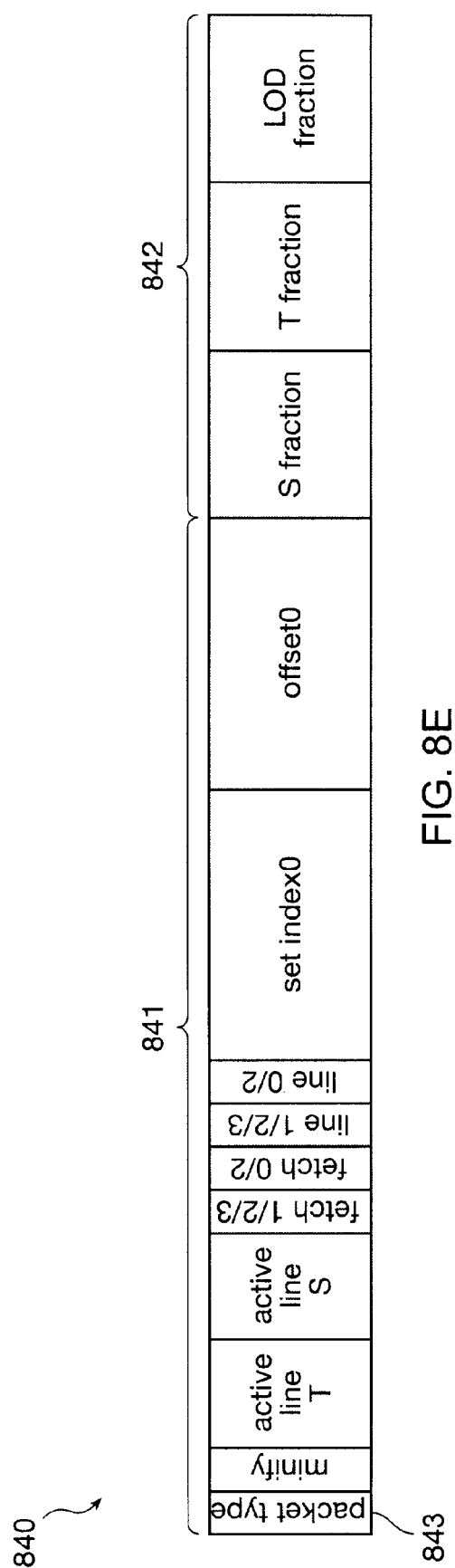
FIG. 8E illustrates a packet generated by the address packer of FIG. 8A.

In either case, address packer 813 packs address information (index and offset), as well as position type, and hit/miss information into a packet 840 (FIG. 8E), so as to reduce the width of a FIFO (first-in-first-out memory) 814 in which such packets are queued while the respective texels are being fetched from memory 112 into cache 125. Packet 840 includes a packet type bit 843 (FIG. 8E) that indicates whether the information in packet 840 includes read address information 841 (from which the address of a to-be retrieved texel in cache memory 125 of FIG. 8A is calculated by cache controller 815), or register information (in all bits other than packet type bit 843). If register information is contained in packet 840, cache controller 815 loads register 815R. In this manner, a mode indicating whether 4 or 16 texels are to be generated is stored in register 815R.

In addition to the above-described address information 841 received in packet 840, cache controller 815 uses the mode (from register 815R) to generate additional addresses for retrieval of texels that are adjacent to and surrounding the texel identified by read address information 841 as described above in reference to FIG. 8D (a total of 4 texel addresses are generated for a quad, and a total of 16 addresses are generated for 4x4). Cache controller 815 also supplies on buses 203, 204 the S fraction, the T fraction and the LOD fraction that are all included as information 842 in packet 840.

Cache controller 815 supplies the just-described fraction signals with an appropriate delay (e.g. 0–2 cycles) so that address signals on buses 203, 204 and texel signals on buses 201 and 202 (supplied by cache memory 125) are synchronized for use by single level trilinear circuit 200 as described above in reference to FIG. 2A. The above-described use of read address information 841 of a single texel (in a quad or 4x4) and the mode in register 815R to generate additional addresses eliminates the need to hold such additional addresses in FIFO 814. Note that, cache controller 815 can use the address information 841 (index and offset) to determine the position type (described above).

For each packet read from FIFO 814, cache controller 815 checks if it involves a hit or miss. If there was a hit, cache controller 815 immediately processes the packet, by passing the address information to cache memory 125, and in response cache memory 125 supplies the data as a texel on bus 209 (that represents both buses 201 and 202 in FIG. 2B). If there was a miss, cache controller 815 waits for the data to arrive from memory 112, and on receipt stores the data in cache 125. The same data is also passed by cache 125 to texel bus 209.

Figure 9A:
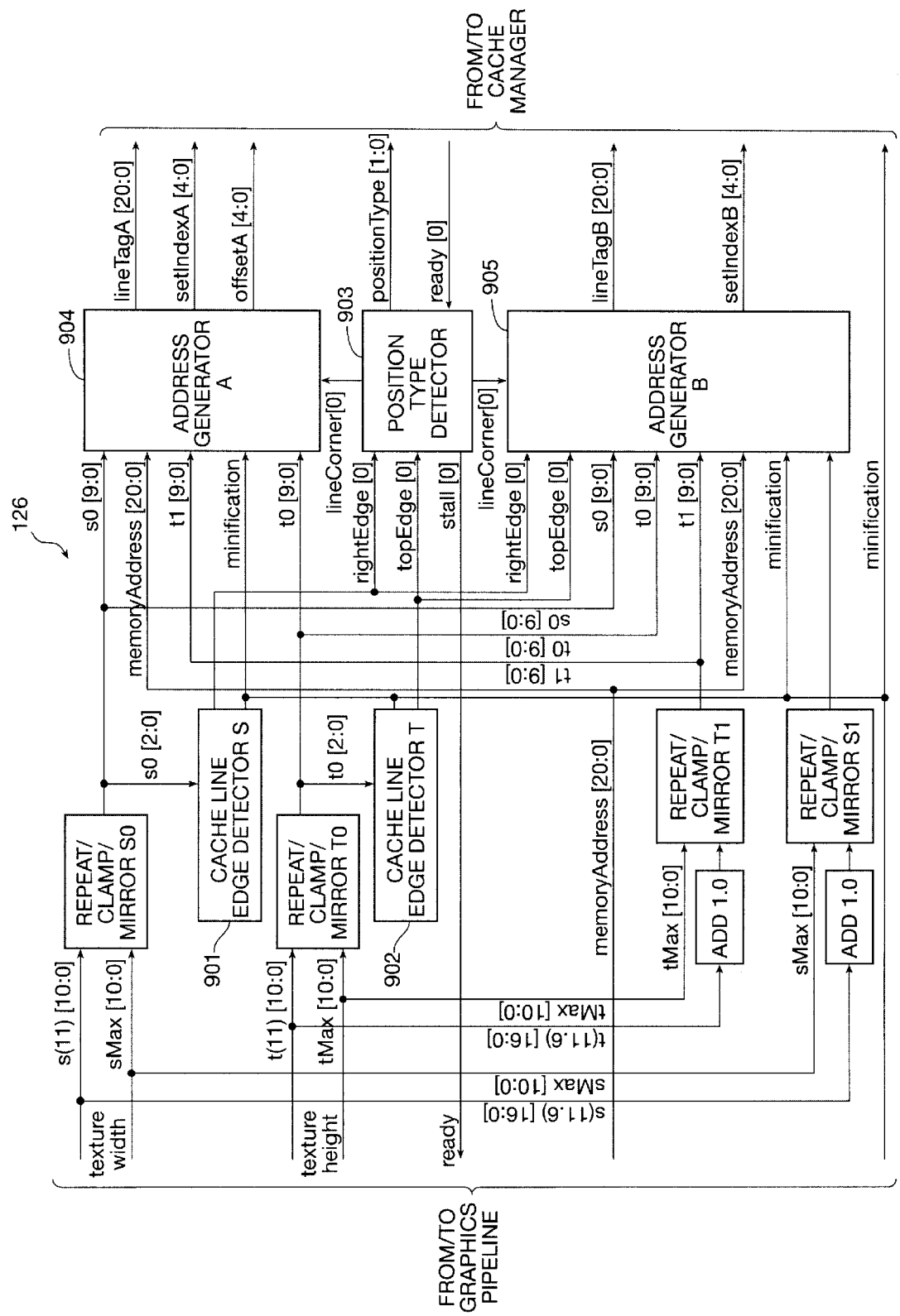
FIGS. 9A and 9B respectively illustrate, in intermediate level block diagrams, components included in the cache address generator and the cache manager illustrated in FIG. 8A.

In one embodiment, cache address generator 126 (FIG. 9A) for single level trilinear circuit 200 (FIG. 2B) includes the following modules from the Appendices (as shown in Table 1 below) that are modified appropriately as described below:

TABLE 1

| MODULE NAME | RELEVANT DISCLOSURE |
| --- | --- |
| address generator A (see item 904 in FIG. 9A) | VERILOG at page 22, line 1417 in Appendix A, described at page 25, line 1 in Appendix C (unmodified) |
| address generator B (see item 905 in FIG. 9A) | VERILOG at page 22, line 1417 in Appendix A, described at page 25, line 1 in Appendix C (unmodified) |
| cache line edge detector S (see item 901 in FIG. 9A) | VERILOG at page 15, line 985 in Appendix A, described at page 24, line 4 in Appendix C (modified as described above in reference to FIG. 8C description related to four-by-fours 832–834 and position types A–D). |
| cache line edge detector T (see item 902 in FIG. 9A) | VERILOG at page 15, line 985 in Appendix A, described at page 24, line 4 in Appendix C (modified as described above in reference to FIG. 8C description related to four-by-fours 832–834 and position types A–D). |
| position type detector (see item 903 in FIG. 9A) | VERILOG at page 20, line 1288 in Appendix A, described at page 25, line 30 in Appendix C (modified as described above in reference to FIG. 8C description related to four-by-fours 832–834 and position types A–D). |
| repeat/clamp/mirror | VERILOG at page 14, line 888 in Appendix A, described at page 21, line 1 in Appendix C (unmodified). |

Figure 9B:
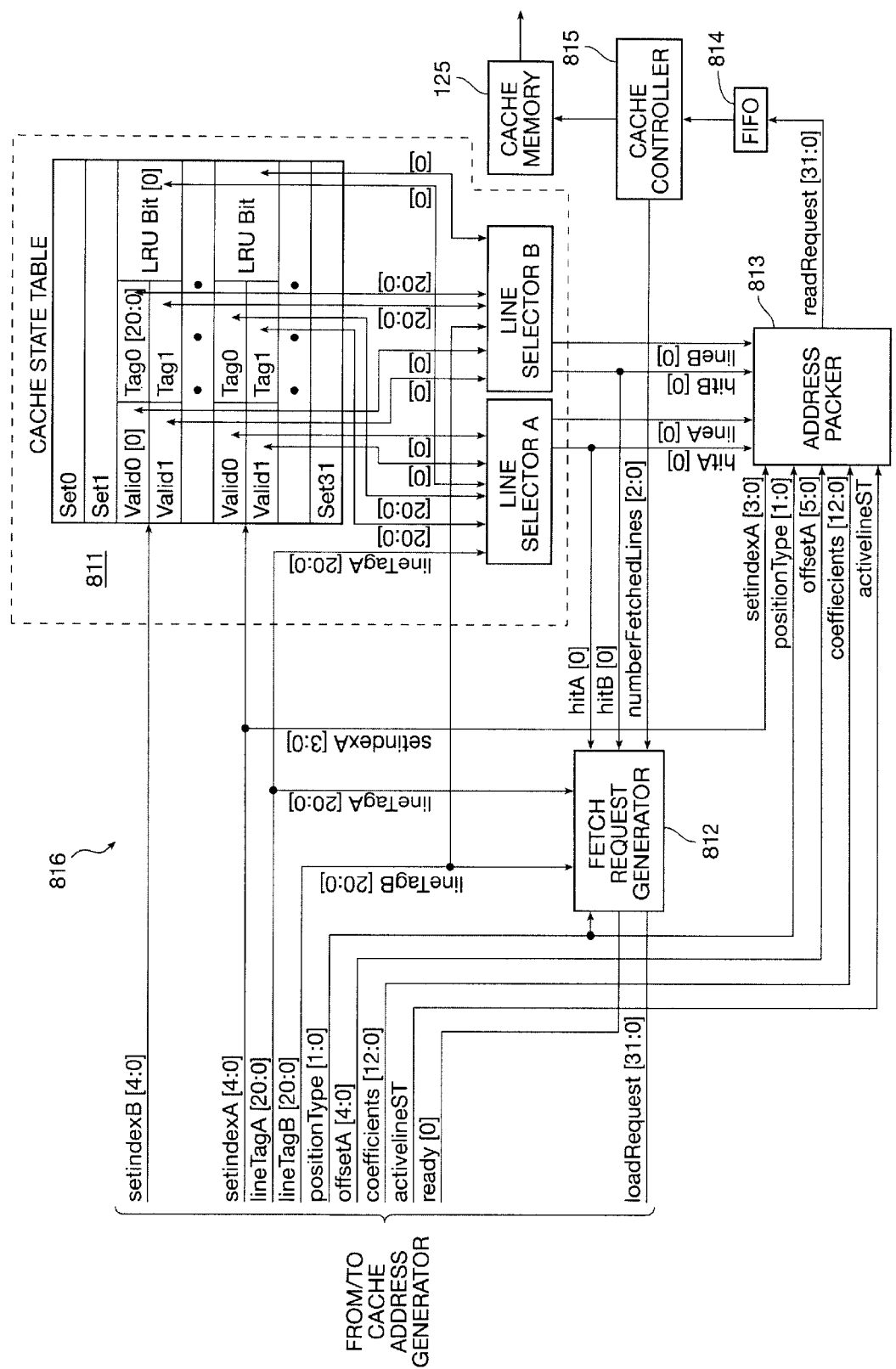

In this embodiment, cache unit 816 includes a cache memory 125 and modules 811–815 (FIG. 9B) that are described in the Appendices as shown in Table 2 below:

TABLE 2

| MODULE NAME | RELEVANT DISCLOSURE |
| --- | --- |
| fetch request generator A (see item 812 in FIG. 9B) | VERILOG at page 1, line 834 in Appendix B, described at page 31, line 1 in Appendix C (unmodified). |
| line selector A (see item 811 in FIG. 9B) | VERILOG at page 9, line 538 in Appendix B, described at page 29, line 1 in Appendix C (unmodified). |
| line selector B | VERILOG at page 9, line 539 in Appendix B, |

TABLE 2-continued

| MODULE NAME | RELEVANT DISCLOSURE |
| --- | --- |
| (see item 811 in FIG. 9B) | described at page 29, line 1 in Appendix C (unmodified). |
| Address packer | VERILOG at page 8, line 560. in Appendix B, |
| (see item 813 in FIG. 9B) | described at page 30, line 1 in Appendix C (unmodified). |
| Cache State Table | VERILOG at page 8, line 625 in Appendix B, |
| (see item 811 in FIG. 9B) | described at page 28, line 1 in Appendix C (unmodified). |
| Cache controller | VERILOG at page 16, line 1302 in Appendix B, |
| (see item 815 in FIG. 9B) | described at page 31, line 30 in Appendix C (modified to generate "read" addresses of surrounding texels as described above in reference to FIG. 8D). |
| FIFO | VERILOG at page 14, line 1130 in Appendix B, |
| (see item 814 in FIG. 9B) | described at page 14, line 1 in Appendix C (unmodified). |

In this embodiment, there are two copies of various components, such as a line selector or an address generator, and two addresses are processed in parallel. So all texels (of a quad or of a four-by-four) that may be present in up to four cache lines (if position type is D) are addressed in two clocks, and a ready signal (described above) is used to stall the graphics pipeline.

Moreover, in a majority of the cases, all texels (of a quad or of a 4×4) are normally present in no more than two cache lines, and these two cache lines are addressed by the two copies. Furthermore, the cache state table of this embodiment allows checking in parallel for two hit/miss conditions. Note that when the position type is A, only one address needs to be generated, and in this case output of the second address generator is ignored.

Cache line edge detectors 901 and 902 (FIG. 9A) included in cache address generator 126 analyze the least significant bits of S and T coordinates to detect whether a quad (or a four-by-four) straddles an edge (such as the right edge or the top edge) of the cache line in the manner described above in reference to FIGS. 8B and 8C. Detectors 901 and 902 determine whether to test for a quad or to test for a four-by-four depending on values of the minification flag and the bilinear/trilinear mode as described above. For example, detectors 901 and 902 test for a four-by-four only if the mode is trilinear and the minification flag is set.

Position type detector 903 uses this information from each of detectors 901 and 902 to determine the position type. For example, when both the top edge and right edge are straddled, signals rightEdge[0] and topEdge[o] (FIG. 9A) are both set, and the position type is D (for both quads and four-by-fours). As another example, when right edge is straddled but top edge is not, signal rightEdge[0] is set and signal topEdge[0] is clear, and the position type is D. Thereafter, position type detector 903 uses the position type to drive a signal lineCorner[O] to address generators 904 and 905.

Depending on whether signal lineCorner[O] is active or not, address generators 904 and 905 generate indices and tags for one clock or two clocks (using the S and T coordinates and the memory address). Address generator 904 also generates an offset that indicates the location of a texel in the cache line identified by the index and tag.

Figure 10A:
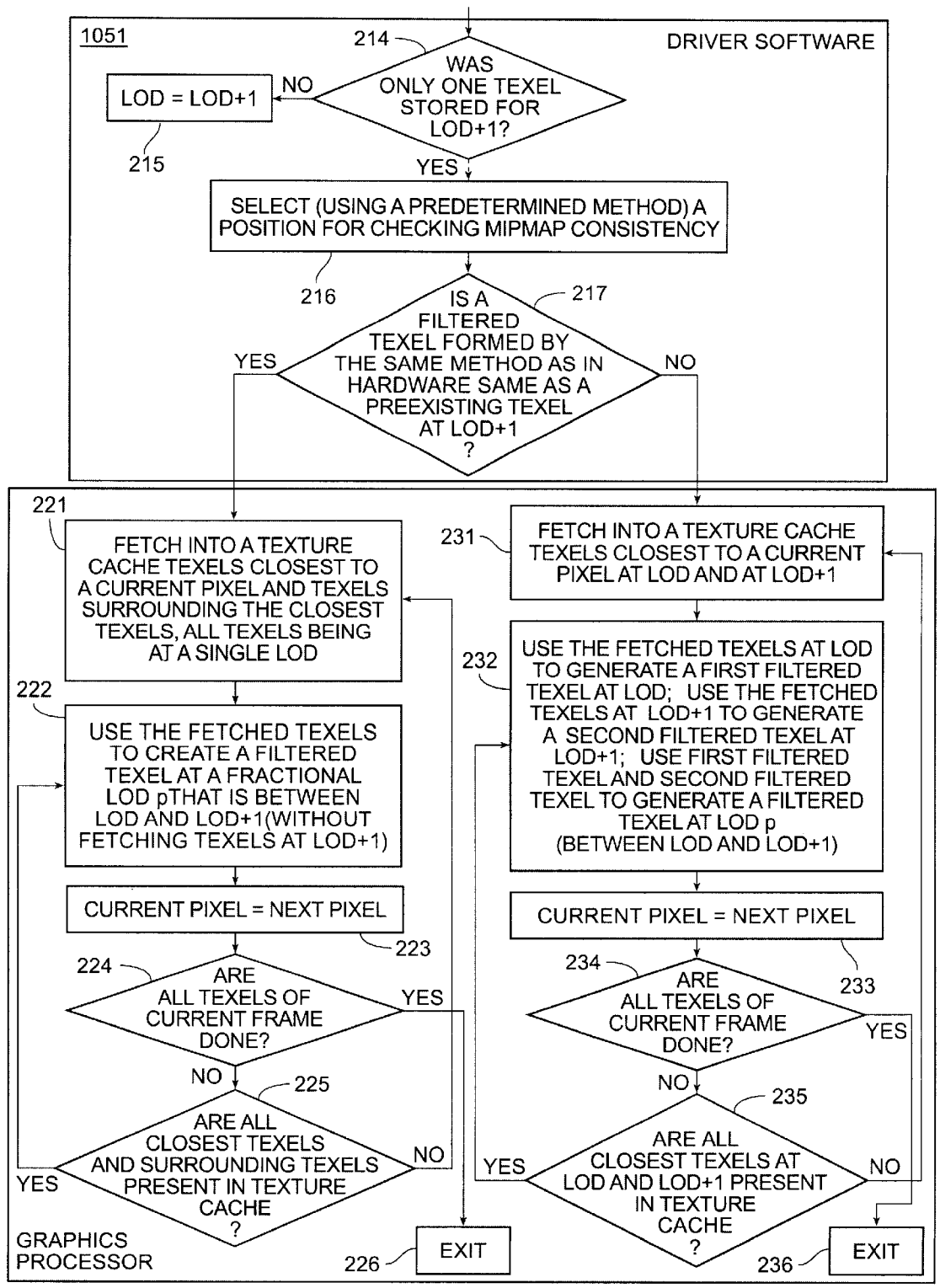
FIGS. 10A and the pair of FIGS. 10B and 10C (together) illustrate, in high level flow charts, two alternative embodiments of the process illustrated in FIG. 2C.

Single level trilinear circuit 200 (FIG. 2B) can be used either directly (as illustrated by processes 210 and 220 in FIG. 2C), or depending on a mode (as illustrated by process 1051 in FIG. 10A) that indicates trilinear filtering to be performed using texels of a single level. Process 1051 includes acts 211–215 and 221–225 described above in reference to process 210 (note that acts 211–213 are not shown in FIG. 10A for convenience). In addition, process 1051 includes acts 216–217 and 231–235.

In act 216, process 1051 selects a position at which mipmap consistency is to be checked. The position can be selected by any predetermined method, e.g. (1) at random or (2) at a position where the value of a texel changes (starting at the upper left corner of a texture and checking two adjacent texels at a time until a difference in the values of adjacent texels exceeds a predetermined threshold). Next, process 1051 checks (in act 217) if a filtered texel formed by performing in software the method (e.g. act 222) in texture system 241 (e.g., in case of a box filter, a regenerated texel formed by bilinear averaging of four texels at level of detail L and nearest to the selected position) is the same as a pre-existing texel in a mipmap at the level of detail L+1. Note that such a filtered texel can be formed by any other method such as gaussian or SINC filtering if circuitry implementing such a method is included in single level trilinear circuit 200 (of texture system 241 in graphics processor 208; see FIG. 2B).

In case of a match, process 1051 performs acts 221–225, and otherwise performs acts 231–235. Therefore, in case of a match process 1051 regenerates additional coarse texels for the trilinear filtering as described above in reference to FIG. 2C. In case of no match, process 1051 fetches (see act 231) in cache 125 texels nearest to the current pixel at level of detail L in a first cycle and nearest texels at level fo detail L+1 in a second cycle. Process 1051 also performs the following subacts (as illustrated by act 232): uses four pre-existing fine texels of the L mipmap to generate a first filtered texel at level of detail L (in the first cycle) and uses four pre-existing coarse texels of the L+1 mipmap to generate a second filtered texel at level of detail L+1 (in the second cycle). Process 1051 also multiplies the first and second filtered texels with either p or (1–p) as appropriate (in the respective first and second cycles), and adds the resulting products (in the second cycle) to generate a filtered texel at a level of detail L+p that is between L and L+1. Acts 233–235 are identical to acts 223–225 described above.

Figure 10B:
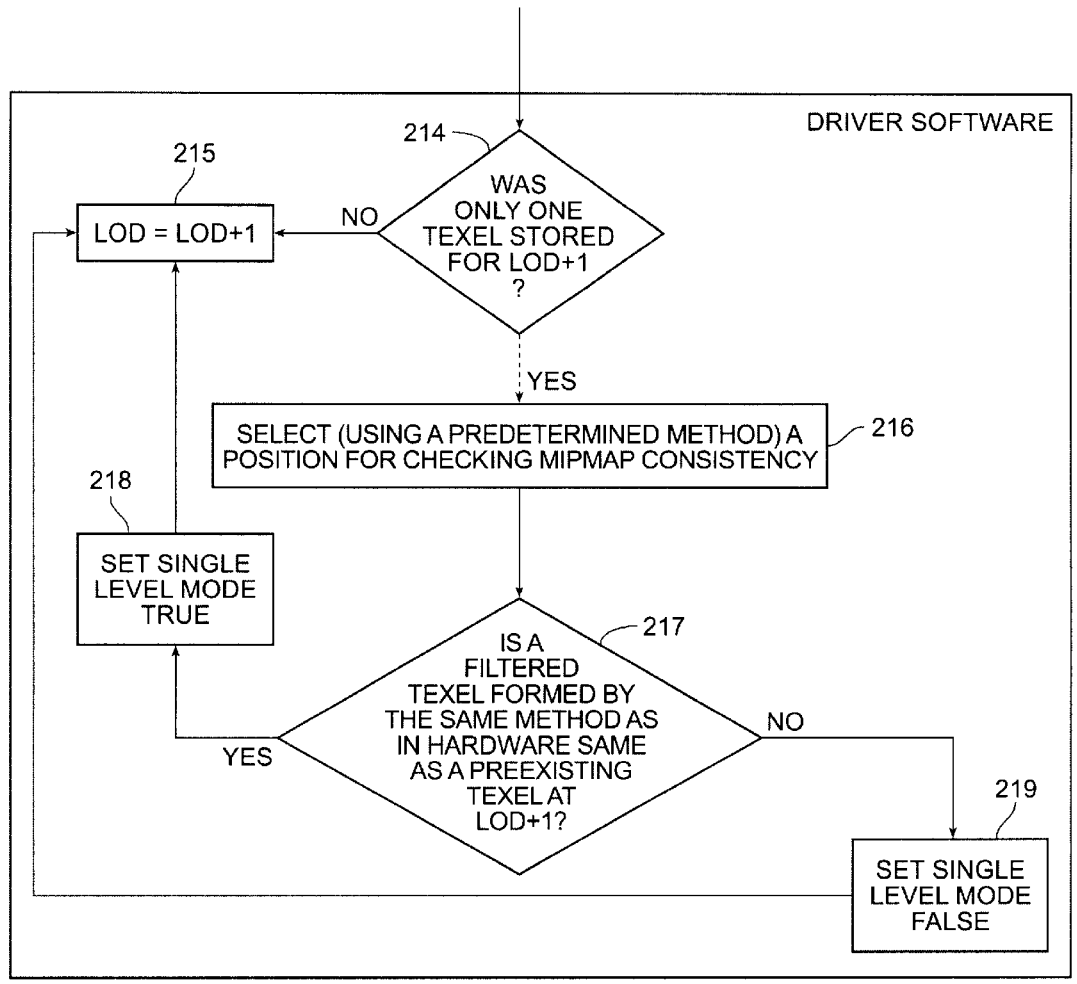
FIG. 10D illustrates, in an intermediate level block diagram, a filter controller that controls a modified single level trilinear circuit in accordance with the processes illustrated in FIG. 10C.
Figure 10C:
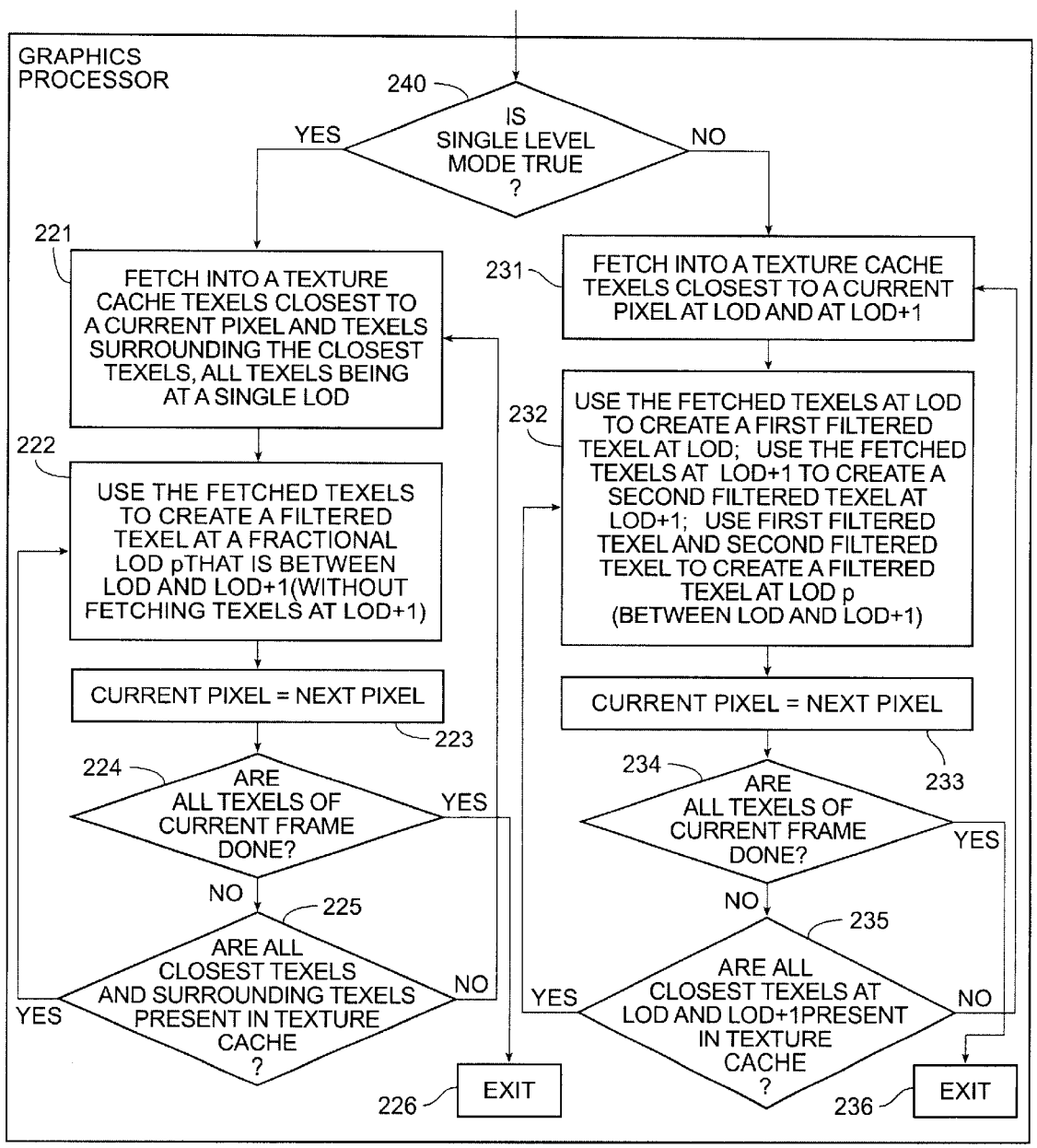

Such trilinear filtering using pre-existing coarse texels (acts 231–235) is useful when texels in the L+1 mipmap were generated by a circuit other than a box filter (such as a SINC filter, a gaussian filter, or a Bartlett filter). Depending on the implementation, acts 211–217 can be performed by driver software in a central processing unit 113 (FIG. 2A) that compares the regenerated texel with the pre-existing texel and sets the mode (as illustrated by acts 218 and 219 in FIG. 10B). In this implementation, acts 221–225 and 231–235 are performed by a texture system 241 (FIG. 2B) in graphics processor 208 (that includes items 120, 801 and 200 as illustrated in FIG. 8A) that checks the mode (in act 240 in FIG. 10C), before selecting between the two sets of acts 221–225 and 231–235.

Note that CPU 113 provides the filter mode to texture system 241 in the same manner as any other mode, such as the texture size, the number of textures to be used in rendering, whether texture is compressed, and whether filtering is trilinear or bilinear.

Figure 10D:
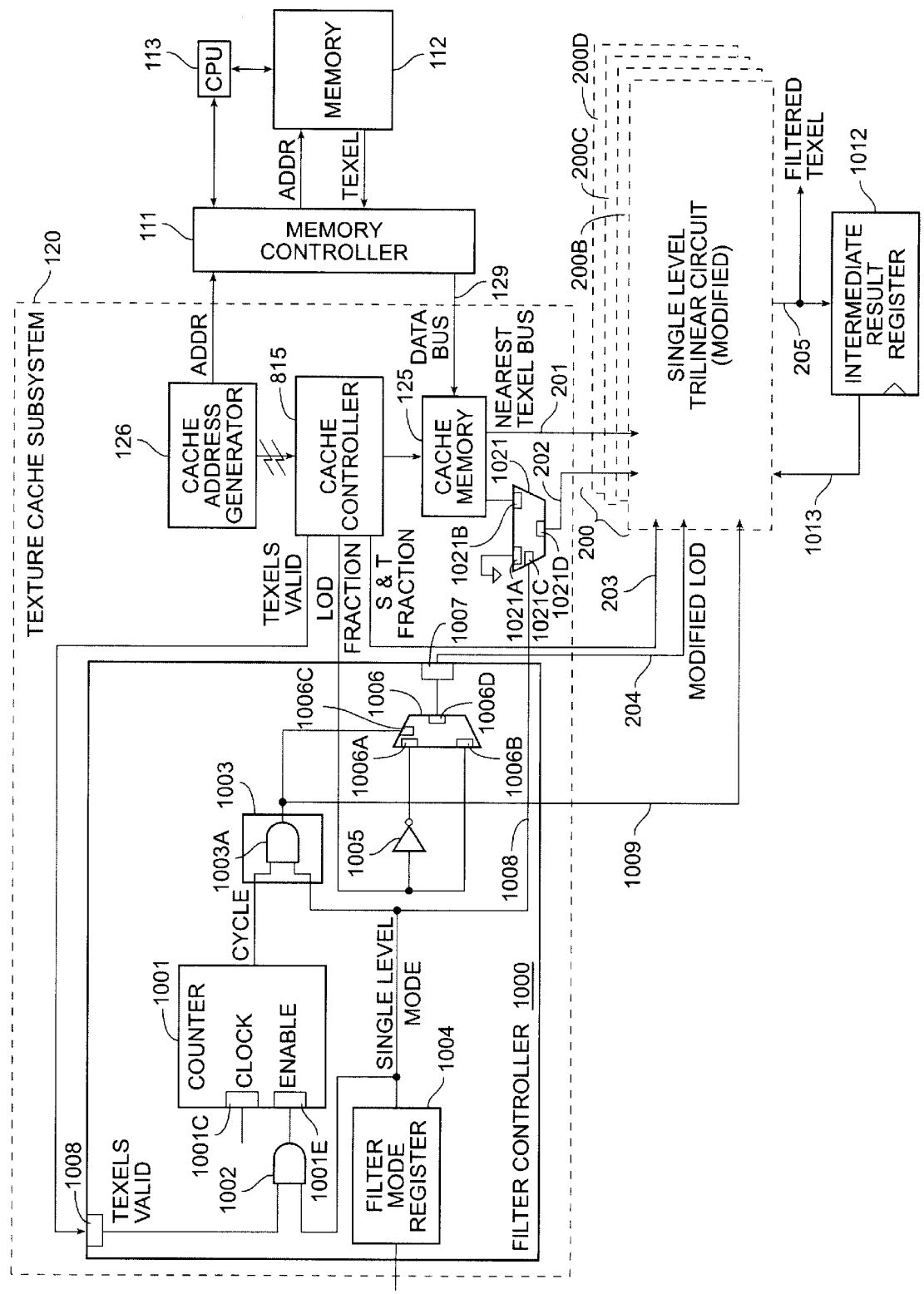

In one embodiment, texture cache subsystem 120 (FIG. 10D) includes a filter controller 1000 that is coupled between cache controller 815 (FIG. 8A) and circuit 200. In this embodiment, cache address generator 126 receives a single level of detail L, and in a first cycle generates the information necessary for cache manager 811 at the level of detail L, and in a second cycle generates the necessary information at the level of detail L+1. The necessary information includes, for example, an index and offset that identify a cache line that contains the to-be-accessed texel, position type (discussed above), and tag that uniquely identifies the texture (relative to other textures). Cache address generator 126 generates the information in two cycles, or alternatively in a single cycle depending on the following signals: minification indicating that a texture is to be minified or magnified, a mode flag indicating whether bilinear and trilinear filtering is to be performed, and a single level trilinear filter mode indicating that trilinear filtering is to be performed using texels from a single mipmap at the level of detail received on the LOD bus. Moreover, in this embodiment, cache controller 815 generates addresses for two quads in two cycles at the levels of detail L and L+1 when the single level trilinear filter mode is not set, trilinear mode is set and minification flag is set. If the just-described signals are all set, cache controller 815 generates the addresses for 16 texels at the single level of detail L in a single cycle. If either the minification flag or the trilinear mode is not set, cache controller 815 generates the addresses for four texels at the single level of detail L, for bilinear filtering.

Filter controller 1000 (FIG. 10D) is also responsive to the single level mode by causing accumulation of the results of the two cycles in case trilinear filtering is being performed in two cycles as described herein.

Filter controller 1000 allows the same circuitry in circuit 200 to be used for trilinear filtering using texels of a single level of detail (in a single cycle) or using texels of two levels of detail (in two cycles) as described below. Specifically, controller 1000 includes a counter 1001 that receives a clock signal at terminal 1001C. Counter 1001 also receives an enable signal at terminal 1001E from an AND gate 1002. AND gate 1002 in turn is coupled to a filter mode register 1004 that holds the mode signal provided by CPU 113 (FIG. 2A). AND gate 1002 is also coupled to cache controller 815 to receive therefrom a texels valid signal indicating that valid values of texels are being provided by cache 125.

Counter 1001 supplies a cycle signal that is alternately on and off, so that the level of detail supplied to circuit 200 is changed between p and ~p. Specifically, counter 1001 is coupled to a logic element 1003 (implemented by AND gate 1003A). Logic element 1003 is also coupled to filter mode register 1004, so that the output of element 1003 is enabled or disabled depending on the mode selected by CPU 113 (disabled in case of trilinear filtering using texels of a single level of detail).

In this embodiment, texture cache subsystem 120 also includes a multiplexer 1021 that is coupled in line with surrounding texel bus 202 between circuit 200 and cache 125. Multiplexer 1021 passes the surrounding texels on to bus 202 only when a signal from register 1004 is active. Therefore, a control terminal 1021C of multiplexer 1021 is coupled to register 1004 and input terminals 1021A are coupled to a source of the ground reference voltage. In this embodiment, circuit 200 has output bus 205 coupled to a register (also called "intermediate result register") 1012 that has an output bus 1013 coupled to circuit 200. Register 1012 is used when filtering texels from two levels of detail to perform the addition described above in reference to act 232 (FIG. 10C).

In one implementation, circuit 200 is modified by including a multiplexer 1014 (FIG. 11A) between LIRPs 339 and 345. Multiplexer 1014 has one input port coupled to LIRP 339 and another input port coupled to terminals 346 that are in turn coupled to intermediate result register 1012. Multiplexer 1014 has the control terminal coupled via terminal 347 to output line 1009 of logic element 1003.

Figure 11A:
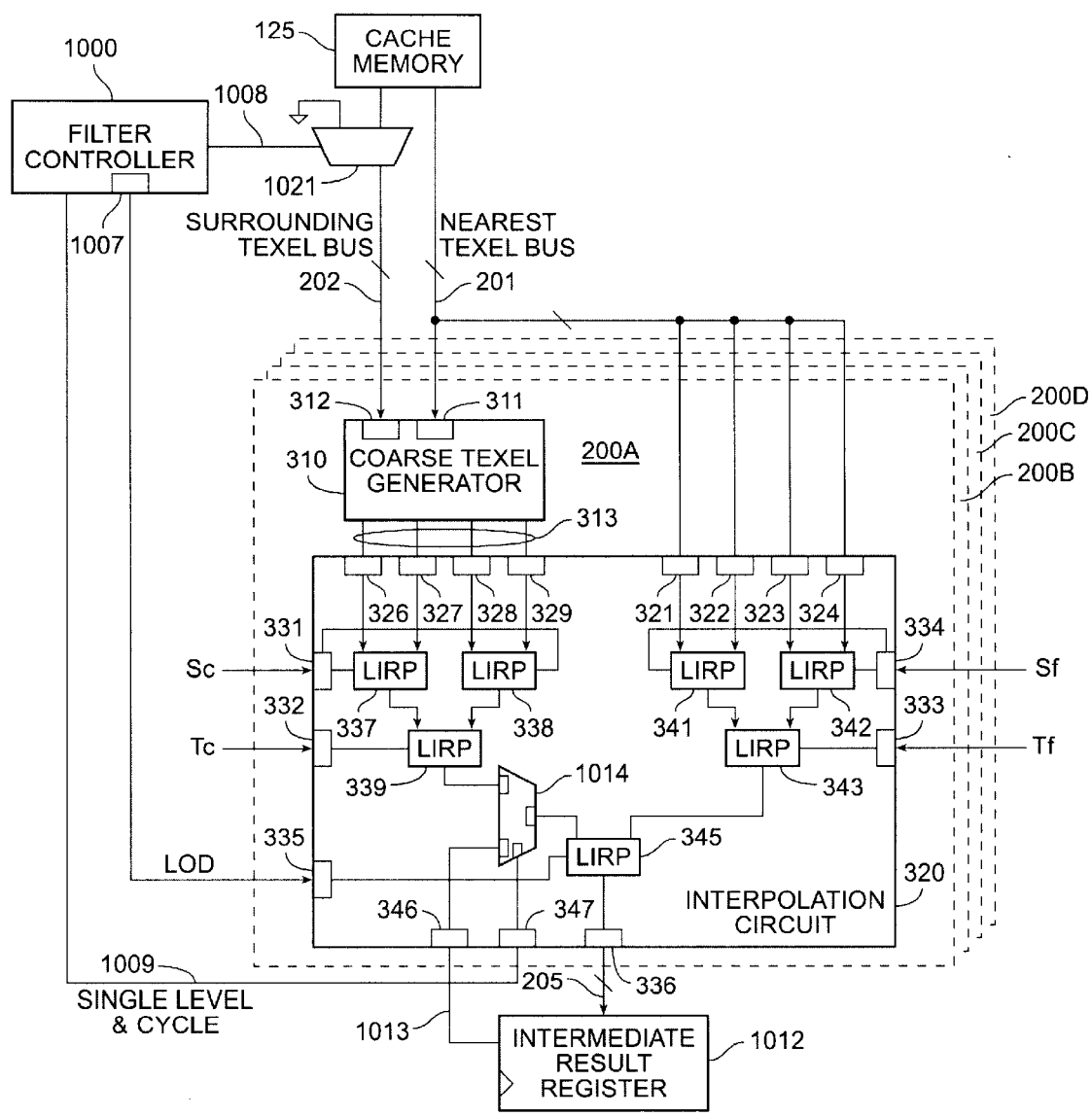
FIGS. 11A and 11B illustrate, in intermediate level block diagrams, multiplexers included in two alternative embodiments of the single level trilinear circuit of FIG. 10D (based on Lirps) to implement the flow chart of FIG. 10C.
Figure 11B:
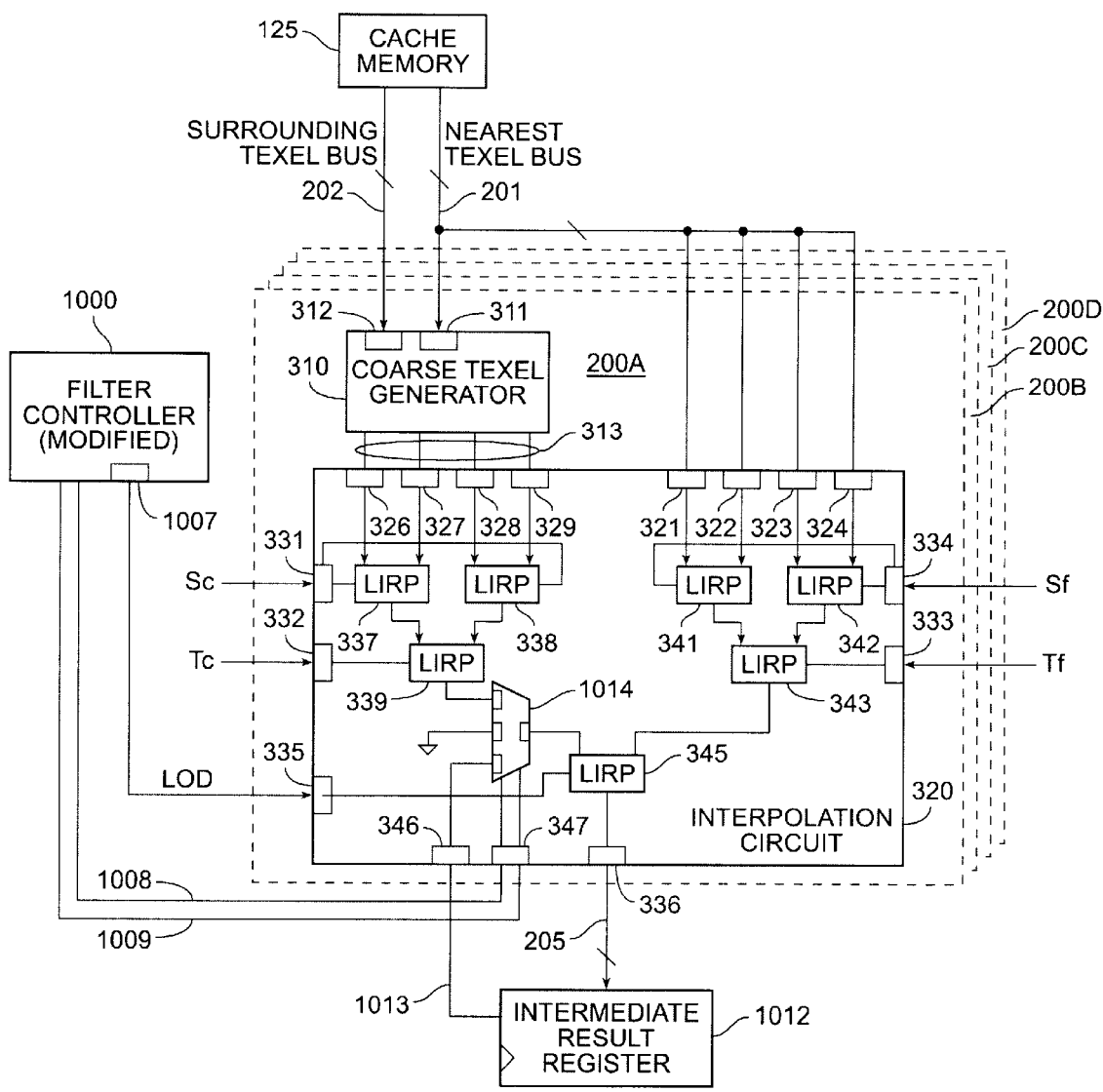
Figure 12A:
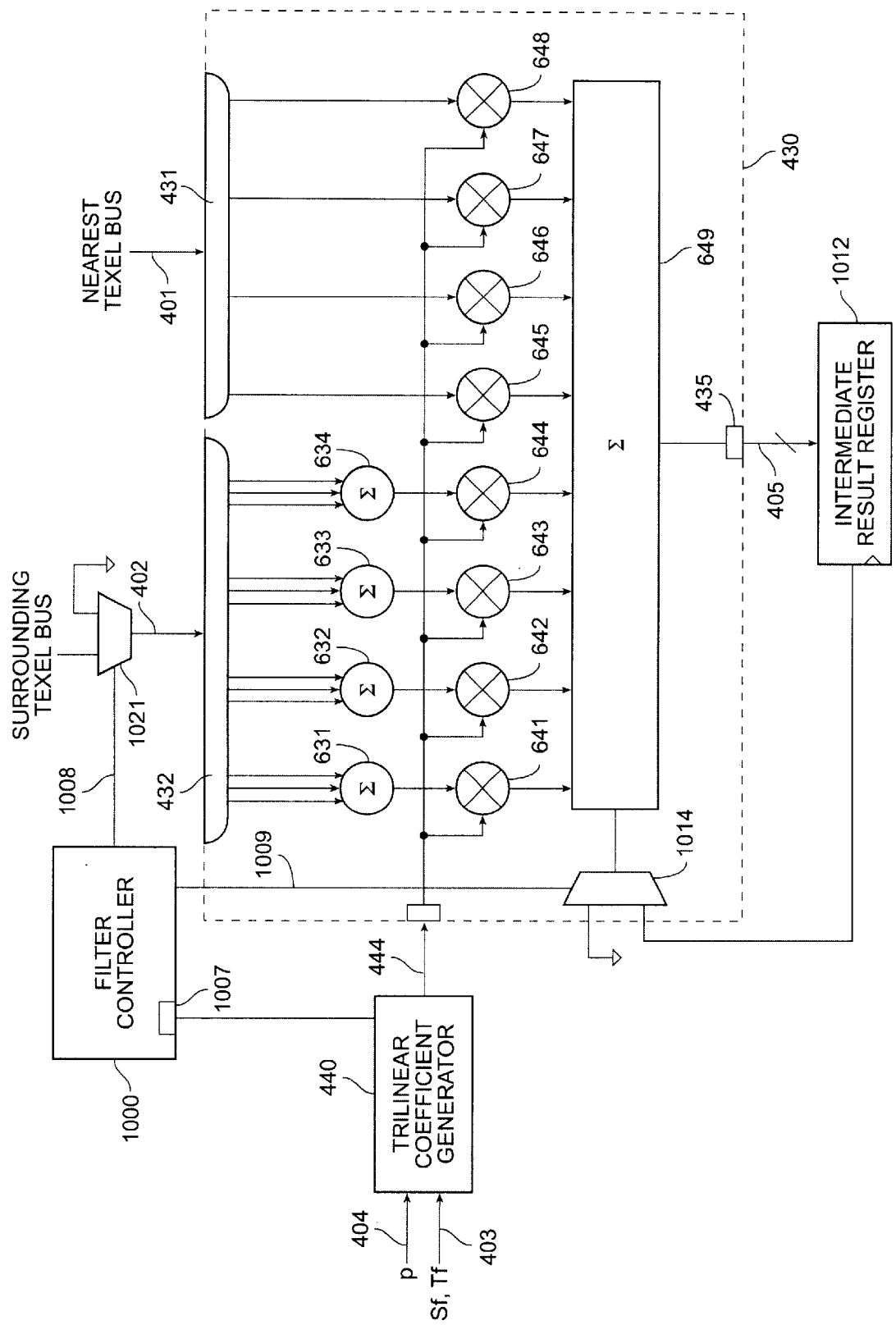
FIGS. 12A and 12B illustrate, in intermediate level block diagrams, multiplexers included in another alternative embodiment of the single level trilinear circuit of FIG. 10D (based on a multiply-add circuit) that implements the flow chart of FIG. 10C.
Figure 12B:
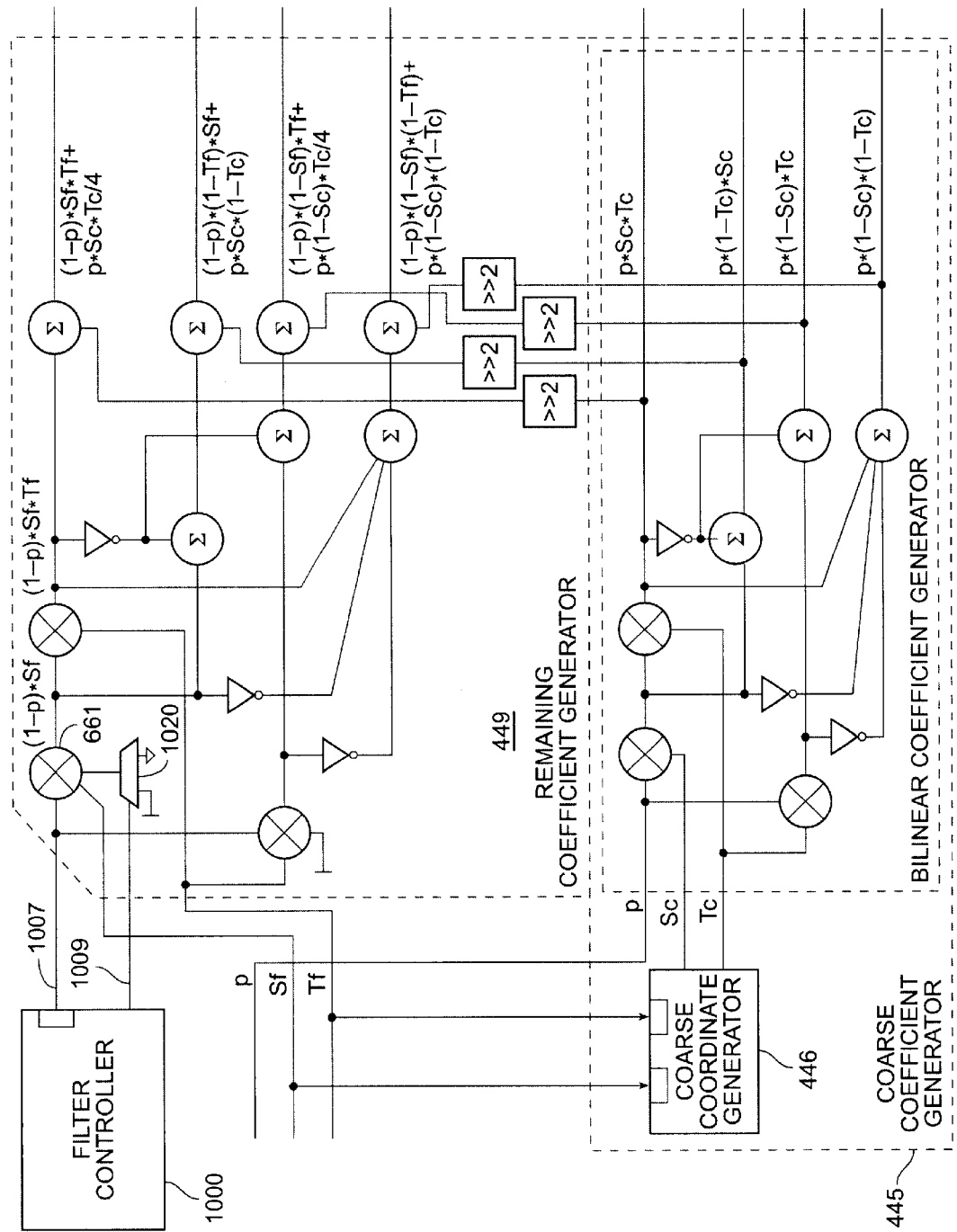

In an alternative implementation, multiplexer 1021 is eliminated, and multiplexer 1014 is a three input multiplexer (FIG. 11B) that has a third input port coupled to a source of the ground reference voltage. In this case, multiplexer 1014 receives a two bit control signal, and responds as follows: selects input signal from LIRP 339 when control signal is 00 or 01, selects ground reference voltage when control signal is 10 and selects input signal from intermediate result register 1012 when control signal is 11. The two bit control signal is formed by concatenating the signals on lines 1008 and 1009. In all other respects the implementations illustrated in FIGS. 11A and 11B are similar or identical to the implementation illustrated in FIG. 3C. Alternatively, implementations similar to those described above in reference to FIGS. 6A and 6C are also possible as illustrated in FIGS. 12A and 12B. In FIG. 12A, output of multiplexer 1014 is coupled to summer 649, and one input port to the source of ground reference voltage and another input port to intermediate result register 1012. Note that multiplexer 1014 selects zero to be supplied to summer 649 when counter 1001 (FIG. 10D) has a zero value stored therein as indicated by a signal on line 1009). In FIG. 12B, intermediate result register 1020 is coupled to multiplier 661.

Although certain embodiments have been described herein, numerous modifications and adaptations of the embodiments are included in the broad scope of the invention. Therefore, in other variants, filters of different orders are used in generation and regeneration. In one example, the first act of generation is done with a gaussian filter (because speed and the number of gates are critical when mipmaps are being generated off-line) and the second act of generation (also called "regeneration") is done with a box filter (because the resulting quad of coarse texels normally needs to be created within a graphics processor that functions within certain constraints (e.g. speed and gate count) imposed by real time display). Moreover, instead of using box filters for both acts, other filters, such as a gaussian filter, or a SINC filter (that is based on sin(x)/x) can be used.

Depending on the application, the above-described single level trilinear circuit 200 can be used for textures that have mipmap levels, as well as for textures that do not have mipmap levels (i.e., have only one level of detail). Examples of textures that have only one level of detail include live video. In a live video example, texture information is provided at LOD level 0, and yet the single level trilinear circuit 200 correctly filters the texture up to LOD level 1 (e.g. a texel at any LOD level in the range 0.0–1.0 is correctly generated as described herein).

In case of magnification, bilinear filtering is implemented by use of a quad in the normal manner, although the above-described hardware (see FIG. 3C) can be used to supply 4×4 texels if a filter order higher than bilinear (such as "filter 4") is implemented for magnification. When magnifying using bilinear filtering, only a quad of texels (i.e., 2×2) are required, and therefore cache misses caused by attempting to fetch 4×4 texels are eliminated. Numerous such modifications and adaptations are encompassed by the attached claims.

What is claimed is:

1. A circuit for use in a texture system, the circuit comprising:
   a nearest texel bus that carries a first group of texels, hereinafter nearest texels, that are located nearest to a to-be-displayed pixel, the nearest texels being at a level of detail L;
   a surrounding texel bus that carries a second group of texels, hereinafter surrounding texels, that each touch a nearest texel in the first group, the surrounding texels also being at the level of detail L;
   a coordinate input bus that carries, at the level of detail L, two coordinates of a to-be-displayed pixel;
   a level of detail bus that carries a fractional level of detail p of the to-be-displayed pixel;
   a texel output bus that carries a texel at a level of detail L+p; and
   an interpolation subcircuit coupled to receive signals from the coordinate input bus, the level of detail bus, the nearest texel bus, and the surrounding texel bus, the interpolation subcircuit being configured to generate an interpolated texel at the level of detail L+p using the nearest texels and the surrounding texels and to supply the interpolated texel to the texel output bus.

2. The circuit of claim 1 wherein the interpolation subcircuit comprises:
   a coarse texel generator having a plurality of input terminals coupled to the nearest texel bus and the surrounding texel bus, the coarse texel generator being configured to generate a coarse texel at a level of detail L+1 using the nearest texels and the surrounding texels and to supply the coarse texel to a coarse texel bus; and
   a trilinear filtering subcircuit coupled to receive signals from the coordinate input bus, the level of detail bus, the nearest texel bus, and the coarse texel bus, the trilinear filtering subcircuit being further coupled to supply the texel at said level of detail L+p to the texel output bus.

3. The circuit of claim 2 wherein the coarse texel generator implements a box filter.

4. The circuit of claim 2 wherein the coarse texel generator includes four arithmetic units, each arithmetic unit comprising:
   an adder coupled to the nearest texel bus to receive a nearest texel, the adder being further coupled to the surrounding texel bus to receive three surrounding texels from the second group; and
   a shifter coupled to receive an input signal from the adder and to supply an output signal to the coarse texel bus.

5. The circuit of claim 4 wherein the trilinear filtering subcircuit includes:
   a pair of first linear interpolators, each first linear interpolator being coupled to a pair of the arithmetic units of the coarse texel generator;
   a pair of second linear interpolators coupled to the nearest texel bus;
   a third linear interpolator coupled to the pair of first linear interpolators;
   a fourth linear interpolator coupled to the pair of second linear interpolators; and
   a fifth linear interpolator coupled to the third linear interpolator, the fourth linear interpolator and the texel output bus.

6. A circuit for use in a texture system, the circuit comprising:
   a nearest texel bus that carries a first group of texels, hereinafter nearest texels, that are located nearest to a to-be-displayed pixel, the nearest texels being at a level of detail L;
   a surrounding texel bus that carries a second group of texels, hereinafter surrounding texels, that each touch a nearest texel in the first group, the surrounding texels also being at the level of detail L;
   a coordinate input bus that carries, at the level of detail L, two coordinates of a to-be-displayed pixel;
   a level of detail bus that carries a fractional level of detail p of the to-be-displayed pixel;
   a texel output bus that carries a texel at a level of detail L+p;
   a trilinear coefficient generator coupled to the coordinate input bus and the level of detail bus, the trilinear coefficient generator having a coefficient bus; and
   a multiply-add circuit coupled to the coefficient bus and to the nearest texel bus.

7. The circuit of claim 6 wherein the multiply-add circuit includes:
   a plurality of adders, each adder being coupled to the surrounding texel bus;
   wherein each adder in the plurality of adders receives a plurality of surrounding texels from the second group, and generates a signal obtained by adding the received texels.

8. The circuit of claim 6 wherein the trilinear coefficient generator includes:
   a coarse coordinate generator coupled to the coordinate input bus;
   a bilinear coefficient generator coupled to receive input signals from the level of detail bus and the coarse coordinate generator and to supply output signals to the coefficient bus.

9. The circuit of claim 6 wherein the another coefficient generator includes:
   an inverter coupled to the level of detail bus; and
   a modified bilinear coefficient generator coupled to the inverter and to the coordinate input bus, said modified bilinear coefficient generator including a plurality of multipliers, at least one of the multipliers adding 1 to an inverted value ~p of the fractional level of detail p at the least significant bit (LSB) position to obtain as a multiplicand (1−p).

10. The circuit of claim 6 wherein the multiply-add circuit includes:
    a plurality of adders, each adder being coupled to the surrounding texel bus and to the nearest texel bus;
    wherein each adder in the plurality of adders receives three surrounding texels from the second group and a nearest texel from the first group, and generates a signal obtained by adding the four received texels.

11. The circuit of claim 6 wherein the trilinear coefficient generator includes:
    a fine coefficient generator coupled to the level of detail bus and the coordinate input bus; and
    a coarse coefficient generator coupled to the level of detail bus and the coordinate input bus, the coarse coefficient generator including a coarse coordinate generator coupled to the coordinate input bus, and a bilinear coefficient generator coupled to the level of detail bus and to the coarse coordinate generator.

12. The circuit of claim 11 wherein the coarse coordinate generator includes:
- a pair of adders, each adder being coupled to receive a respective one of a horizontal coordinate signal and a vertical coordinate signal from the coordinate input bus, each adder subtracting 0.5 from the respective one of horizontal coordinate signal and vertical coordinate signal.

13. A circuit in a texture system, the circuit comprising:
- a texel input bus coupled to a cache;
- a plurality of arithmetic units coupled to the texel input bus; and
- an interpolation circuit comprising:
    - a pair of first linear interpolators, each first linear interpolator being coupled to a pair of arithmetic units in the plurality;
    - a pair of second linear interpolators coupled to the texel input bus;
    - a third linear interpolator coupled to the pair of first linear interpolators;
    - a fourth linear interpolator coupled to the pair of second linear interpolators; and
    - a fifth linear interpolator coupled to the third linear interpolator, the fourth linear interpolator and to a texel output bus;
- wherein each arithmetic unit includes an adder coupled to the texel input bus, and a two-bit shifter coupled to the adder;
- each adder receives four texels, one of said four texels being a texel nearest to a to-be-displayed pixel;
- each adder adds the four texels and supplies the sum to said two-bit shifter; and
- each two-bit shifter right shifts the sum by two bits, thereby to divide the sum by 4, to yield a coarse texel.

14. A circuit in a texture system, the circuit comprising:
- a texel input bus;
- a coarse coordinate generator having a horizontal coordinate input port, a vertical coordinate input port, a horizontal coordinate output bus, and a vertical coordinate output bus, the coarse coordinate generator including a pair of arithmetic units, each arithmetic unit being coupled to receive a fine coordinate signal from a respective one of the horizontal coordinate input port and the vertical coordinate input port, each arithmetic unit passing a coarse coordinate signal to the respective one of the horizontal coordinate output bus, and the vertical coordinate output bus;
- a bilinear coefficient generator coupled to the horizontal coordinate output bus and to the vertical coordinate output bus;
- a modified bilinear coefficient generator coupled to an inverter and to the coordinate input bus, said modified bilinear coefficient generator including a plurality of multipliers, at least one of the multipliers adding 1 to an inverted value ~p of a fractional level of detail p to obtain as a multiplicand (1−p); and
- a multiply-add circuit having a coefficient bus, a plurality of adders coupled to the texel input bus, a plurality of multipliers, each multiplier in a group of multipliers in the plurality being coupled to an adder in the plurality of adders, each multiplier in the group being coupled to the coefficient bus.

15. The circuit of claim 14 wherein:
- the texel input bus carries sixteen texels; and
- each adder in the plurality receives four texels from the texel input bus.

16. The circuit of claim 14 wherein:
- the texel input bus carries sixteen texels;
- each adder in the plurality receives three texels from the texel input bus; and
- the modified bilinear coefficient generator includes a group of adders, each adder in the group being coupled to the bilinear coefficient generator.

17. A circuit for use in a texture system, the circuit comprising:
- a cache;
- a first multiplexer having a plurality of first input terminals and a plurality of second input terminals coupled via an inverter to the plurality of first input terminals, the first multiplexer further having a control terminal and a plurality of output terminals;
- a filter controller including a counter coupled to the control terminal of the multiplexer; and
- a filter circuit having:
    - a texel input bus coupled to the cache;
    - a level of detail bus that carries a fractional level of detail p of a to-be-displayed pixel, the level of detail bus being coupled to the plurality of output terminals of the first multiplexer; and
    - a coordinate input bus that carries two coordinates of the to-be-displayed pixel,
- the filter circuit configured to operate in a selectable one of a first mode wherein filtered texels at a level of detail L+p are generated using only texels at a fine level of detail L and a second mode wherein filtered texels at the level of detail L+p are generated using texels at the fine level of detail L and texels at a coarse level of detail L+1,
- the output of the first multiplexer causing one of the first mode and the second mode to be selected.

18. The circuit of claim 17 wherein the filter controller further comprises:
- a register coupled to the counter; and
- a logic element having one input terminal coupled to the counter and another input terminal coupled to the register, the logic element further having an output terminal coupled to the control terminal of the first multiplexer.

19. The circuit of claim 18 further comprising:
- a second multiplexer having a control terminal coupled to the register and a group of input terminals coupled to the source of the ground reference voltage.

20. The circuit of claim 19 wherein:
- the second multiplexer has another group of input terminals coupled to the cache and a group of output terminals coupled to the texel input bus of the filter circuit.

21. The circuit of claim 19 wherein:
- the second multiplexer has another group of input terminals coupled to a first linear interpolator included in the filter circuit and a group of output terminals coupled to a second linear interpolator included in the filter circuit.

22. A circuit for use in a texture system, the circuit comprising:
- a cache;
- a first multiplexer having a plurality of first input terminals and a plurality of second input terminals coupled via an inverter to the plurality of first input terminals, the first multiplexer further having a control terminal and a plurality of output terminals;

a filter controller having:
 a counter coupled to the control terminal of the multiplexer;
 a register coupled to the counter; and
 a logic element having one input terminal coupled to the counter and another input terminal coupled to the register, the logic element further having an output terminal coupled to the control terminal of the first multiplexer;

a filter circuit having:
 a texel input bus coupled to the cache;
 a level of detail bus that carries a fractional level of detail p of a to-be-displayed pixel, the level of detail bus being coupled to the plurality of output terminals of the first multiplexer; and
 a coordinate input bus that carries two coordinates of the to-be-displayed pixel; and a second multiplexer having a control terminal coupled to the register and a group of input terminals coupled to the source of the ground reference voltage; and an intermediate result register coupled to the output bus of the filter circuit, the intermediate result register having a plurality of output terminals;

wherein the second multiplexer has another group of input terminals coupled to a first linear interpolator included in the filter circuit and a group of output terminals coupled to a second linear interpolator included in the filter circuit; and wherein the second multiplexer has yet another group of input terminals coupled to the plurality of output terminals of the intermediate result register.

23. The circuit of claim 22 further comprising:
a coarse texel generator having a plurality of fine texel terminals coupled to the texel input bus, the coarse texel generator having a coarse texel bus that carries a third group of texels.

24. The circuit of claim 23 further comprising:
a pair of first linear interpolators coupled to the coarse texel generator;
a pair of second linear interpolators coupled to the texel input bus;
a third linear interpolator coupled to the pair of first linear interpolators;
a fourth linear interpolator coupled to the pair of second linear interpolators; and
a fifth linear interpolator coupled to the third linear interpolator, the fourth linear interpolator and the texel output bus.

25. A circuit for use in a texture system, the circuit comprising:
a cache;
a first multiplexer having a plurality of first input terminals and a plurality of second input terminals coupled via an inverter to the plurality of first input terminals, the first multiplexer further having a control terminal and a plurality of output terminals;
a filter controller having:
 a counter coupled to the control terminal of the multiplexer;
 a register coupled to the counter; and
 a logic element having one input terminal coupled to the counter and another input terminal coupled to the register, the logic element further having an output terminal coupled to the control terminal of the first multiplexer;
a filter circuit having:
 a texel input bus coupled to the cache;
 a level of detail bus that carries a fractional level of detail p of a to-be-displayed pixel, the level of detail bus being coupled to the plurality of output terminals of the first multiplexer; and
 a coordinate input bus that carries two coordinates of the to-be-displayed pixel;
a trilinear coefficient generator coupled to the coordinate input bus and the level of detail bus, the trilinear coefficient generator having a coefficient bus;
a multiply-add circuit coupled to the coefficient bus and to the nearest texel bus; and
a second multiplexer having a control terminal coupled to the register and a group of input terminals coupled to a source of the ground reference voltage.

26. The circuit of claim 1, wherein the interpolation subcircuit comprises:
a trilinear coefficient generator coupled to receive the signals from the coordinate input bus and the level of detail bus, the trilinear coefficient generator configured to generate a plurality of coefficients and to supply the plurality of coefficients to a coefficient bus; and
a multiply-add subcircuit coupled to receive the signals from the nearest texel bus, the surrounding texel bus, and the coefficient bus, the multiply-add subcircuit configured to generate the interpolated texel by computing weighted sums of the nearest texels and the surrounding texels, wherein the plurality of coefficients are used as weights in the weighted sums.

27. The circuit of claim 26, wherein the multiply-add subcircuit comprises:
a plurality of first adders, each coupled to receive at least two of the surrounding texels and to output a summed texel;
a corresponding plurality of first multipliers, each coupled to receive a summed texel from a respective one of the plurality of first adders and to receive a respective one of the plurality of coefficients, each first multiplier outputting a weighted summed texel;
a plurality of second multipliers, each coupled to receive a respective one of the nearest texels and a corresponding one of the plurality of coefficients, each second multiplier outputting a weighted nearest texel; and
a second adder coupled to receive the weighted summed texels and the weighted nearest texels and to output the interpolated texel.

28. A process for generating a filtered texel value for a to-be-displayed pixel having an intermediate level of detail L+p between a fine level of detail L and a coarse level of detail L+1, the process comprising:
fetching into a cache a group of nearest fine texels from a texture map at the fine level of detail L, the nearest fine texels being located nearest to the to-be-displayed pixel;
fetching into the cache a group of surrounding fine texels from the texture map at the fine level of detail L, each of the surrounding fine texels being located adjacent to one of the nearest fine texels; and
computing a filtered texel value at the intermediate level of detail L+p using the nearest fine texels and the surrounding fine texels, without fetching into the cache any texels at the coarse level of detail L+1.

29. The process of claim 25, wherein computing a filtered texel value comprises:
generating a plurality of coarse texels at the coarse level of detail L+1 using the nearest fine texels and the surrounding fine texels; and
interpolating between the generated coarse texels and the nearest fine texels to produce the filtered texel value.

30. The process of claim 28, wherein computing a filtered texel value comprises:
computing a plurality of coefficients using coordinates of the to-be-displayed pixel and the intermediate level of detail L+p;
multiplying each of the nearest fine texels and each of the surrounding fine texels by a respective one of the plurality of coefficients, thereby producing a plurality of weighted texels; and
adding the weighted texels together to produce the filtered texel value.

31. A process for generating a filtered texel, the process comprising:
storing in a main memory a first mipmap at a fine level of detail L, the first mipmap comprising a plurality of fine texels;
storing in the main memory a second mipmap at a coarse level of detail L+1;
fetching into a cache from the main memory a group of fine texels selected from the first mipmap;
generating a coarse texel using the group of fine texels; and
using the group of fine texels and the generated coarse texel to compute a filtered texel at an intermediate level of detail between the fine level of detail L and the coarse level of detail L+1.

32. The process of claim 31, wherein:
the second mipmap is generated using a filter of order F, and
generating the coarse texel includes using a filter of order F.

33. The process of claim 31, wherein:
the second mipmap is generated using a box filter, and
generating the coarse texel includes using a box filter.

34. The process of claim 31, wherein:
the group of fine texels includes four quads, each quad touching two other quads, and
generating the coarse texel includes averaging fine texels within each quad.

35. A process of generating a filtered texel from a plurality of texels including a first group of nearest fine texels located nearest to a to-be-displayed pixel and a second group of surrounding fine texels located adjacent to the nearest fine texels, the process comprising:
generating a first plurality of coefficients and a second plurality of coefficients from a horizontal coordinate of the to-be-displayed pixel, a vertical coordinate of the to-be-displayed pixel, and a level of detail of the to-be-displayed pixel;
adding surrounding fine texels in subgroups to form a plurality of summed texels;
multiplying each of the plurality of summed texels by a corresponding one of the first plurality of coefficients, thereby generating a plurality of weighted summed texels;
multiplying each of the nearest fine texels by a corresponding one of the second plurality of coefficients, thereby generating a plurality of weighted nearest texels; and
adding the weighted summed texels and the weighted nearest texels, thereby generating a filtered texel having a level of detail L+p that is intermediate between a level of detail L of the fine texels and a coarser level of detail L+1.

36. The process of claim 35, wherein:
the first group of nearest fine texels consists of four texels arranged in a quad,
the second group of surrounding fine texels consists of twelve texels surrounding the quad, and
surrounding fine texels are added in subgroups of three texels each, wherein each of the three surrounding fine texels in a particular subgroup is adjacent to a common one of the nearest fine texels.

37. A process for generating a filtered texel value, comprising:
receiving a current mode, the current mode being one of a first mode or a second mode;
in response to the first mode, performing the process of claim 28; and
in response to the second mode, performing the following acts:
fetching into a cache a group of nearest fine texels from a texture map at a fine level of detail L, the nearest fine texels being located nearest to the to-be-displayed pixel;
fetching into the cache a group of nearest coarse texels from a texture map at a coarse level of detail L+1; and
performing an interpolation using the group of nearest fine texels and the group of nearest coarse texels to compute the filtered texel value.

38. The process of claim 37, further comprising:
retrieving a coarse texel at the level of detail L+1 from a texture memory;
regenerating the coarse texel using additional fine texels at the level of detail L;
comparing the retrieved coarse texel with the regenerated coarse texel; and
setting the current mode based on the comparison.

39. The process of claim 38, wherein:
the acts of retrieving a coarse texel from a texture memory, regenerating the coarse texel, and comparing the retrieved coarse texel with the regenerated coarse texel are performed by a main processor, and
the act of receiving a current mode and the acts performed in response to each of the first mode and the second mode are performed by a graphics subsystem.

40. A process for generating a trilinear filtered value, comprising:
receiving a first plurality of texel values into a cache, the plurality of texels being from a single level of detail in a multi-level texture map;
reading a second plurality of texel values from the cache, at least some of the second plurality of texel values included in the first plurality of texel values;
multiplying the read texel values by corresponding coefficients; and
forming the trilinear filtered value by combining the multiply results;

wherein the formed trilinear filtered value is not formed from any level of detail of the multi-level texture map other than the single level of detail.

41. The process of claim 40, wherein:

the only texel values from the single level of detail used to form the trilinear filtered value are from a four-by-four texel region within the single level of detail.

42. The process of claim 40, wherein:

at least some of the read texel values are added together before the multiplying step to form a first intermediate result, the first intermediate result being multiplied by a one of the corresponding coefficients.

* * * * *